United States Patent [19]

Kubo et al.

[11] Patent Number: 5,436,102
[45] Date of Patent: Jul. 25, 1995

[54] MAGNETIC DEVELOPING AGENT AND ELECTROPHOTOGRAPHIC APPARATUS USING SAID AGENT

[75] Inventors: Shunichi Kubo; Masao Shionoya, both of Tokyo, Japan

[73] Assignee: Olympus Optical Co., Ltd., Tokyo, Japan

[21] Appl. No.: 120,129

[22] Filed: Sep. 10, 1993

[30] Foreign Application Priority Data

Sep. 14, 1992 [JP] Japan ................ 4-244963
Nov. 26, 1992 [JP] Japan ................ 4-317058

[51] Int. Cl.⁶ .................. G03G 9/083; G03G 15/09
[52] U.S. Cl. .................. 430/106.6; 430/903; 355/251
[58] Field of Search ............ 430/106.6, 903; 355/251

[56] References Cited

U.S. PATENT DOCUMENTS

| | | | |
|---|---|---|---|
| 4,111,823 | 9/1978 | Kobayashi et al. | 252/62.53 |
| 4,121,931 | 10/1978 | Nelson | 430/122 |
| 4,142,981 | 3/1979 | Bean et al. | |
| 4,239,845 | 12/1980 | Tanaka et al. | 430/122 |
| 4,436,803 | 3/1984 | Ikeda et al. | 430/106.6 |
| 4,540,646 | 9/1985 | Kambara et al. | 430/122 |
| 4,599,292 | 7/1986 | Kambara et al. | 430/122 |

FOREIGN PATENT DOCUMENTS

| | | | |
|---|---|---|---|
| 16145 | 2/1981 | Japan | 430/106.6 |
| 10150 | 1/1982 | Japan | 430/106.6 |
| 57-64251 | 4/1982 | Japan | . |
| 105164 | 6/1983 | Japan | 430/106.6 |
| 105166 | 6/1983 | Japan | 430/106.6 |
| 276065 | 11/1988 | Japan | 430/106.6 |

*Primary Examiner*—Roland Martin
*Attorney, Agent, or Firm*—Frishauf, Holtz, Goodman & Woodward

[57] ABSTRACT

An apparatus develops an electrostatic latent image formed on an image carrier by attaching a developing agent containing toners, thereby converting the latent image into a toner image, transfers the toner image on a sheet, and fixes the toner image, thereby recording an image. The developing agent consists of a first magnetic toner containing less than 45 wt. % of a magnetic powder and having a comparatively low magnetism and low charge amount, and a second magnetic toner which has almost the same particle diameter as that of the first magnetic toner and charge characteristics of the same polarity as that of the first magnetic toner, contains 45 wt. % or more of a magnetic powder, and has a comparatively high magnetism and low charge amount. The first and second magnetic toners are mixed with a formulating proportion of 20 to 99 parts by weight and 1 to 80 parts by weight, respectively. The apparatus includes a convey mechanism for conveying the developing agent to the image carrier with a magnetism.

27 Claims, 11 Drawing Sheets

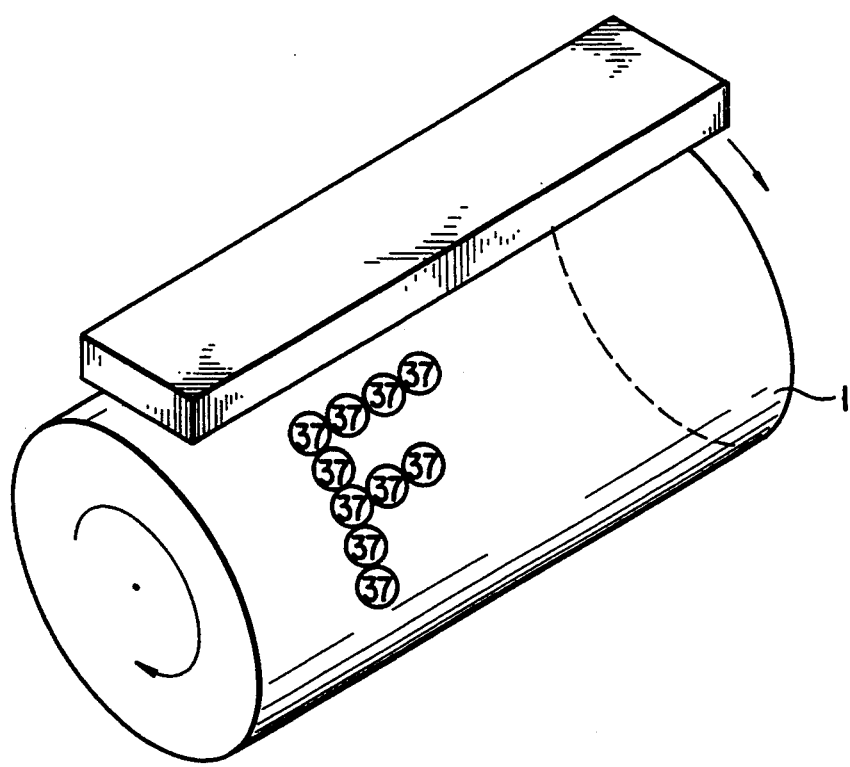
F I G. 4
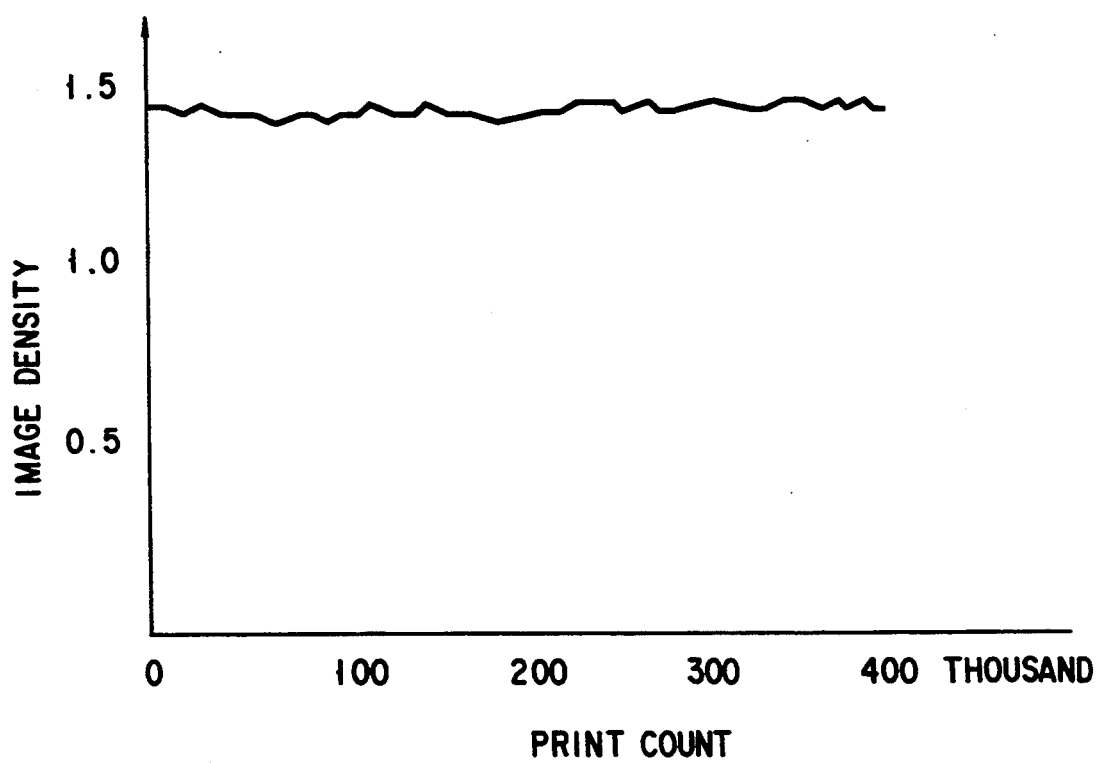
F I G. 5

|  | COMPARATIVE EXAMPLE | | | | | EXAMPLE | | | | |
|---|---|---|---|---|---|---|---|---|---|---|
| TONER | #1 | #2 | #3 | #4 | #5 | #6 | #7 | #8 | #9 | #10 |
| IMAGE DENSITY OF INITIAL IMAGE | ○ | ○ | ○ | × | × | ○ | ○ | ○ | ○ | △ |
| FOG OF INITIAL IMAGE | × | × | △ | △ | ○ | ○ | ○ | ○ | ○ | ○ |
| INITIAL SOLID BLACK IMAGE | × | × | × | ○ | ○ | ○ | ○ | ○ | ○ | ○ |
| CHANGE IN DENSITY OF DURABILITY IMAGE | × | × | × | △ | △ | ○ | ○ | ○ | ○ | ○ |

○ : GOOD
△ : FAIR
× : BAD

F I G. 7

|  | EXAMPLE | | | | | COMPARATIVE EXAMPLE |
|---|---|---|---|---|---|---|
| TONER | #16 | #17 | #18 | #19 | #20 | #21 |
| IMAGE DENSITY OF INITIAL IMAGE | ○ | ○ | ○ | ○ | ○ | ○ |
| FOG OF INITIAL IMAGE | △ | ○ | ○ | ○ | △ | × |
| INITIAL SOLID BLACK IMAGE | × | △ | △ | ○ | ○ | × |
| CHANGE IN DENSITY OF DURABILITY IMAGE | ○ | ○ | × | ○ | ○ | × |

○ : GOOD
△ : FAIR
× : BAD

F I G. 8

|  | EXAMPLE | | | | | | | COMPARATIVE EXAMPLE | |
|---|---|---|---|---|---|---|---|---|---|
| TONAR | #22 | #23 | #24 | #25 | #26 | #27 | #28 | #29 | #30 |
| IMAGE DENSITY OF INITIAL IMAGE | △ | ○ | ○ | ○ | ○ | ○ | ○ | ○ | × |
| FOG OF INITIAL IMAGE | ○ | ○ | ○ | ○ | ○ | ○ | ○ | △ | ○ |
| INITIAL SOLID BLACK IMAGE | ○ | ○ | ○ | ○ | ○ | ○ | △ | × | ○ |
| CHANGE IN DENSITY OF DURABILITY IMAGE | ○ | ○ | ○ | ○ | ○ | ○ | △ | × | △ |

○ : GOOD
△ : FAIR
× : BAD

F I G. 9

| TONER | #31 | #32 | #33 | #34 | #35 | #36 | #37 | #38 | #39 |
|---|---|---|---|---|---|---|---|---|---|
| FIRST MAGNETIC TONER (PARTS BY WEIGHT) | 100 | 99 | 98 | 95 | 90 | 80 | 70 | 60 | 50 |
| SECOND MAGNETIC TONER (PARTS BY WEIGHT) | 0 | 1 | 2 | 5 | 10 | 20 | 30 | 40 | 50 |

F I G. 10

| REPLENISHING TONER | #31 | #32 | #33 | #34 | #35 | #36 | #37 | #38 | #39 |
|---|---|---|---|---|---|---|---|---|---|
| CHANGE IN IMAGE DENSITY | ○ | ○ | ○ | ○ | ○ | △ | △ | × | × |
| SHEET COUNT (THOUSANT) | 400 | 400 | 400 | 400 | 200 | 200 | 100 | 100 | 50 |

F I G. 11

| SURFACE POTENTIAL | POTENTIAL OF BLACK PORTION (V) | POTENTIAL OF WHITE PORTION (V) |
|---|---|---|
| ELECTROSTATIC ELECTROPHOTOGRAPHY APPARATUS A | −250 | −50 |
| ELECTROSTATIC ELECTROPHOTOGRAPHY APPARATUS B | −1000 | −200 |

F I G. 12

| | IMAGE DENSITY | | | FOG | | |
|---|---|---|---|---|---|---|
| DEVELOPING AGENT | EXAMPLE 1 | FIRST TONER | SECOND TONER | EXAMPLE 1 | FIRST TONER | SECOND TONER |
| ELECTROSTATIC ELECTROPHOTOGRAPHY APPARATUS A | 1.4 | 1.2 | 0.5 | ○ | × | ○ |
| ELECTROSTATIC ELECTROPHOTOGRAPHY APPARATUS B | 1.4 | 1.4 | 1.4 | ○ | ○ | ○ |

○ : GOOD
× : BAD

F I G. 13

| AC VOLTAGE | 0 V | 100 V | 200 V | 300 V | 400 V | 500 V |
|---|---|---|---|---|---|---|
| DC VOLTAGE 0 V | △ | ○ | ○ | ○ | △ | × |
| -20 V | ○ | ○ | ○ | ○ | ○ | ○ |
| -40 V | ○ | ○ | ○ | ○ | ○ | ○ |
| -60 V | ○ | ○ | ○ | ○ | △ | × |
| -80 V | △ | △ | △ | △ | × | × |
| -100 V | × | × | × | × | × | × |

F I G. 14

| | COMPARATIVE EXAMPLE | | | | | EXAMPLE | | | | |
|---|---|---|---|---|---|---|---|---|---|---|
| TONER | #01 | #02 | #03 | #04 | #05 | #06 | #07 | #08 | #09 | #010 |
| IMAGE DENSITY OF INITIAL IMAGE | ○ | ○ | ○ | × | × | ○ | ○ | ○ | ○ | △ |
| FOG OF INITIAL IMAGE | × | × | △ | △ | ○ | △ | ○ | ○ | ○ | ○ |
| INITIAL SOLID BLACK IMAGE | × | × | × | ○ | ○ | ○ | ○ | ○ | ○ | ○ |
| CHANGE IN DENSITY OF DURABILITY IMAGE | × | × | × | △ | △ | ○ | ○ | ○ | ○ | ○ |

○ : GOOD
△ : FAIR
× : BAD

F I G. 15

| | EXAMPLE | | | | | | COMPARATIVE EXAMPLE |
|---|---|---|---|---|---|---|---|
| TONER | #016 | #017 | #018 | #019 | #020 | #021 | #022 |
| IMAGE DENSITY OF INITIAL IMAGE | ○ | ○ | ○ | ○ | ○ | ○ | ○ |
| FOG OF INITIAL IMAGE | △ | ○ | ○ | ○ | ○ | ○ | × |
| INITIAL SOLID BLACK IMAGE | × | △ | ○ | × | ○ | ○ | × |
| CHANGE IN DENSITY OF DURABILTY IMAGE | × | × | ○ | × | ○ | ○ | × |

○ : GOOD
△ : FAIR
× : BAD

F I G. 16

|  | EXAMPLE | | | | | | | COMPARATIVE EXAMPLE | |
|---|---|---|---|---|---|---|---|---|---|
| TONER | #023 | #024 | #025 | #026 | #027 | #028 | #029 | #030 | #031 |
| IMAGE DENSITY OF INITIAL IMAGE | △ | ○ | ○ | ○ | ○ | ○ | ○ | ○ | × |
| FOG OF INITIAL IMAGE | ○ | ○ | ○ | ○ | ○ | ○ | ○ | △ | ○ |
| INITIAL SOLID BLACK IMAGE | ○ | ○ | ○ | ○ | ○ | ○ | △ | × | ○ |
| CHANGE IN DENSITY OF DURABILTY IMAGE | ○ | ○ | ○ | ○ | ○ | ○ | △ | × | △ |

○ : GOOD
△ : FAIR
× : BAD

F I G. 17

| TONER | #032 | #033 | #034 | #035 | #036 | #037 | #038 | #039 | #040 |
|---|---|---|---|---|---|---|---|---|---|
| FIRST MAGNETIC TONER (PARTS BY WEIGHT) | 100 | 99 | 98 | 95 | 90 | 80 | 70 | 60 | 50 |
| SECOND MAGNETIC TONER (PARTS BY WEIGHT) | 0 | 1 | 2 | 5 | 10 | 20 | 30 | 40 | 50 |

F I G. 18

| REPLENISHING TONER | #03 | #033 | #034 | #035 | #036 | #037 | #038 | #039 | #040 |
|---|---|---|---|---|---|---|---|---|---|
| CHANGE IN IMAGE DENSITY | ○ | ○ | ○ | ○ | ○ | △ | △ | × | × |
| SHEET COUNT (THOUSAND) | 400 | 400 | 400 | 400 | 200 | 200 | 100 | 100 | 50 |

F I G. 19

| SURFACE POTENTIAL | POTENTIAL OF BLACK PORTION (V) | POTENTIAL OF WHITH PORTION (V) |
|---|---|---|
| ELECTROSTATIC ELECTROPHOTOGRAPHY APPARATUS A | -300 | -50 |
| ELECTROSTATIC ELECTROPHOTOGRAPHY APPARATUS B | -800 | -150 |

F I G. 20

| DEVELOPING AGENT | IMAGE DENSITY | | | FOG | | |
|---|---|---|---|---|---|---|
| | EXAMPLE 1 | FIRST TONER | SECOND TONER | EXAMPLE 1 | FIRST TONER | SECOND TONER |
| ELECTROSTATIC ELECTROPHOTOGRAPHY APPARATUS A | 1.4 | 1.4 | 0.9 | ○ | × | ○ |
| ELECTROSTATIC ELECTROPHOTOGRAPHY APPARATUS B | 1.4 | 1.4 | 1.4 | ○ | ○ | ○ |

○ : GOOD
× : BAD

FIG. 21

| AC VOLTAGE | 0 V | 100 V | 200 V | 300 V | 400 V | 500 V |
|---|---|---|---|---|---|---|
| DC VOLTAGE 0 V | △ | ○ | ○ | ○ | △ | × |
| −20 V | ○ | ○ | ○ | ○ | ○ | ○ |
| −40 V | ○ | ○ | ○ | ○ | ○ | ○ |
| −60 V | △ | ○ | ○ | ○ | △ | × |
| −80 V | △ | △ | △ | △ | × | × |
| −100 V | × | × | × | × | × | × |

FIG. 22

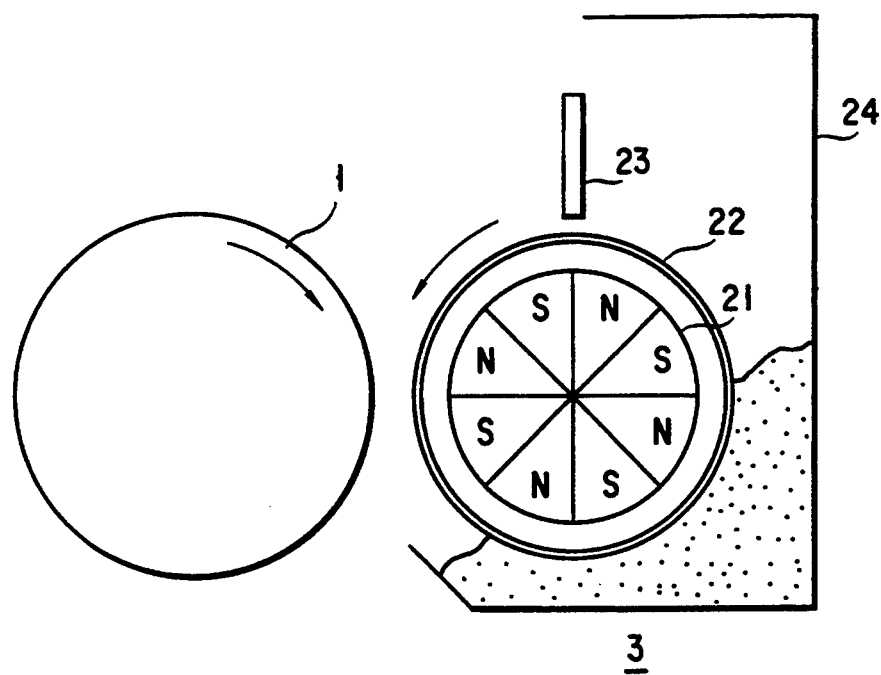
F I G. 24
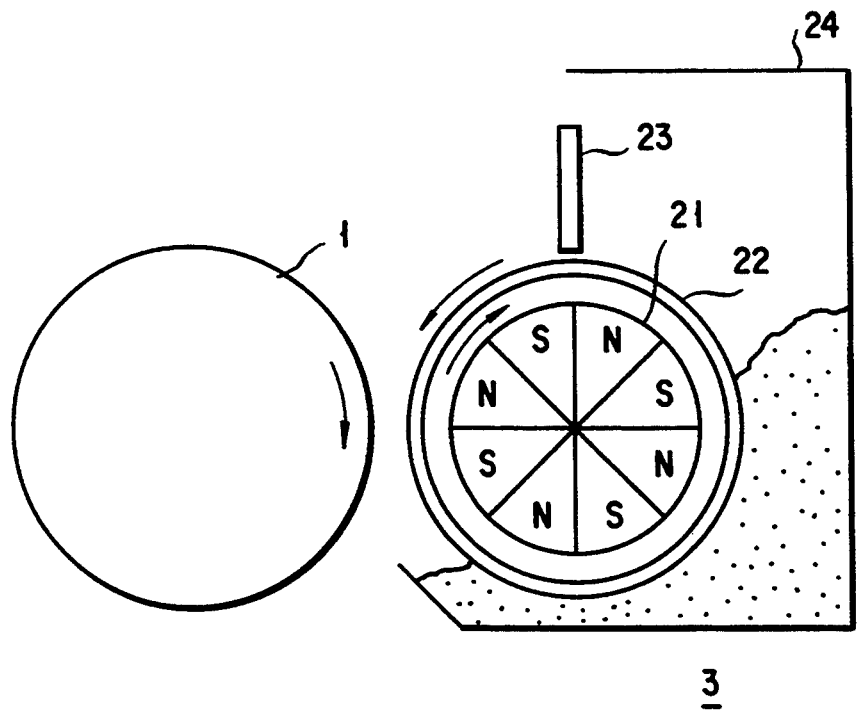
F I G. 25

MAGNETIC DEVELOPING AGENT AND ELECTROPHOTOGRAPHIC APPARATUS USING SAID AGENT

BACKGROUND OF THE INVENTION

1. Field of the Invention

The present invention relates to an electrostatic electrophotography apparatus of the electrophotography method for forming an electrostatic latent image on an image carrier, and developing the electrostatic latent image with toner, thereby copying or printing an image and, more particularly, to an electrostatic electrophotography apparatus capable of stably performing high-quality development by using an insulating one-component developing agent as a developing agent.

2. Description of the Related Art

An arrangement of an electrostatic electrophotography apparatus serving as a printer of the electrophotography method is shown in FIG. 23.

The arrangement shown in FIG. 23 is an electrostatic electrophotography apparatus of a dry type called ionography. FIG. 23 is a view for explaining the outline of this electrostatic electrophotography apparatus.

As shown in FIG. 23, a drum-shaped image carrier 1 made of a dielectric material is used. A latent image forming unit 2, e.g., an ion cartridge is arranged for forming an electrostatic latent image on the image carrier 1. A developing unit 3 supplies toner to the image carrier 1. An electrostatic latent image formed on the image carrier 1 by the latent image forming unit 2 is developed as a toner image by the developing unit 3.

A transfer unit 4 generates positive or negative corona ions. A sheet 5 is supplied to the position of the image carrier 1. The transfer unit 4 emits corona ions toward the image carrier 1 via the sheet 5. The sheet 5 is charged by the corona ions. By this charging, the toner image on the image carrier 1 is attracted to and transferred on the sheet 5. The toner image transferred on the sheet 5 is not fixed yet. The recording sheet 5 having the non-fixed toner image thereon is conveyed to a fixing unit 7 by a paper convey unit 6. The fixing unit 7 fixes the non-fixed toner image on the sheet 5.

The toner not transferred to the sheet 5 and remaining on the image carrier 1 is scraped by a cleaning unit 8. The electrostatic latent image remaining on the image carrier 1 is erased by an eraser 9. The toner scraped by the cleaning unit 8 is collected by a collecting unit 13.

A paper feed unit 10 feeds the sheets 5 one by one in order to transfer toner images. The paper feed unit 10 has a sheet cassette 10a and a pickup roller 10b. The sheet cassette 10a stores cut sheets (standard sheets) in a stacked manner therein. The pickup roller 10b picks up the sheets 5 one by one from the recording sheet cassette 10a. The sheet 5 fed by the paper feed unit 10 is guided to the position of the transfer unit 4 by a paper guide member 11. A guide member 14 is used for guiding the sheet 5 from the position of the transfer unit 4 to the fixing unit 7.

The image carrier 1 has a drum shape, and the latent image forming unit 2, the developing unit 3, the transfer unit 4, the toner collecting unit 13, the cleaning unit 8, and the eraser 9 are arranged at predetermined positions around the image carrier 1. As the image carrier 1 is rotated, the circumferential surface of the image carrier 1 sequentially passes the positions of these units.

In the apparatus shown in FIG. 23, when printing is performed, the image carrier 1 is rotated at a predetermined speed. The electrostatic latent image of an image to be printed is formed on the circumferential surface of the image carrier 1 by the latent image forming unit 2. The toner is supplied to the surface of the image carrier 1 by the developing unit 3, so that the toner attaches to the electrostatic latent image forming portion on the image carrier 1. Hence, the electrostatic latent image forms a toner image. A sheet 5 is fed to the position of the transfer unit 4 by the paper feed unit 10, and the sheet 5 is moved at the same speed as the peripheral speed of the image carrier 1.

The toner image is transferred to the recording sheet 5 by the transfer unit 4 and sent to the fixing unit 7 by the paper convey unit 6. The toner image on the sheet 5 is fixed by being heated by the fixing unit 7.

In this manner, a latent image is developed by a toner serving as a developing agent, transferred to a sheet 5, and thermally fixed, so that the latent image is printed. Electrostatic electrophotography apparatuses include, in addition to this ionography printer (IDP), a laser beam printer (LBP) for forming a latent image on the image carrier 1 with a laser beam.

In an electrostatic electrophotography apparatus, e.g., an IDP or a LBP, the developing process is performed by applying toner by a developing unit usually employing a one- or two-component developing agent.

Of one- and two-component developing agents, a magnetic one-component toner is often used because of its easy maintenance. A magnetic one-component toner developing method is a method using a developing agent made of only an insulating toner containing magnetic particles. Accordingly, this developing agent does not contain a magnetic carrier.

The toner particles used in the magnetic one-component toner developing method have an average particle diameter of about 10 $\mu$m. One toner particle contains about 30 to 60 wt. % of magnetic particles, e.g., magnetite. A typical structure of the developing unit 3 using the magnetic one-component toner is as shown in FIGS. 24 and 25.

More specifically, as shown in FIGS. 24 and 25, the developing unit 3 comprises a columnar magnet roller 21 and a cylindrical sleeve 22 made of, e.g., stainless steel and arranged outside the magnet roller 21. When either or both of the magnet roller 21 and the sleeve 22 are rotated, charging and conveyance of the toner is performed. At this time, the toner on the sleeve 22 is uniformed to a thin layer by a blade 23 and transported to the image carrier 1, thereby developing the electrostatic latent image on the image carrier 1.

When the section of the columnar magnet roller 21 is observed, for example, a plurality of magnetic poles are alternately formed in the magnet roller 21 equiangularly about the central axis of the column as the center. The magnet roller 21 has this sectional structure throughout its length.

The sleeve 22 stores the magnet roller 21 therein. The sleeve 22 is arranged to be close to the image carrier 1 such that the central axes of the sleeve 22 and the image carrier 1 are parallel to each other. The sleeve 22 is rotated at the same peripheral speed as that of the image carrier 1.

In the arrangement shown in FIG. 24, the magnet roller 21 is stationary and stopped at a predetermined position in the sleeve 22. In the arrangement shown in FIG. 25, the magnet roller 21 is rotatable, and is rotated in the sleeve 22 in a direction opposite to the rotating direction of the sleeve 22.

The sleeve 22 incorporating the magnet roller 21 is arranged in a box body 24 of the developing unit 3. The space in which the sleeve 22 is arranged in the box body 24 is not a closed independent space, but a portion of the sleeve 22 opposing the image carrier 1 is moved close to the image carrier 1 while it is exposed in the box body 24.

The blade 23 is arranged above the sleeve 22. A magnetic toner serving as the developing agent is filled in the box body 24, and is attracted to the surface of the sleeve 22 by the magnetism of the magnet roller 21 of the sleeve 22. As the sleeve 22 is rotated, the magnetic toner attracted to the surface of the sleeve 22 is conveyed to the image carrier 1 side. At this time, the blade 23 uniforms the thickness of the toner layer on the sleeve 22 to form a thin layer throughout the entire length of the sleeve 22.

As the sleeve 22 is rotated, the magnetic poles of the magnet roller 21 in the sleeve 22 are moved in a direction relatively opposite to the moving direction of the sleeve 22. Thus, due to the influence of the movement of the magnetic poles of the magnet roller 21, the magnetic toner attaching to the surface of the sleeve 22 is rotated and agitated on the surface of the sleeve 22. Because of friction of the toner particles accompanying this agitation, the magnetic toner is charged.

If the polarity of the charges and the polarity of the latent image formed on the image carrier 1 are opposite, a toner image appears on the image carrier 1 since the toner is attracted by the latent image, thereby performing development.

The insulating one-component developing method is a method described so far. This method is advantageous in terms of easy maintenance and little contamination of the machine itself caused by the toner.

These advantages are obtained partly because the insulating one-component developing method uses only a magnetic toner as a developing unit. That is, the developing agent does not contain at all a carrier serving as the magnetic particles for charging the toner by agitation, unlike in the two-component developing agent. Since the developing agent does not contain a carrier at all, the concentration of the toner need not be detected. Since this method is free from the problem of degradation in performance of the carrier, the developing agent need not be exchanged, thereby simplifying maintenance.

Since a heavy carrier is not contained, the developing agent is lightweight, so that it can be handled easily, leading to an easy maintenance.

One of other advantages is obtained because a magnetic toner is used. If the toner used is magnetic one, the toner scatters less than non-magnetic toner in the machine, leading to a long maintenance cycle. If the interior of the machine is not soiled with the scattered toner, the service life of the machine is prolonged.

This developing method, however, has following problems.

If the potential of the latent image is low, the image quality of the toner image obtained by development is low. For example, if the potential of the latent image is 600 V or less in absolute value, especially if the electrostatic latent image has a low potential of ±300 V, the image quality of the toner image obtained by development is low. This is because the magnetic toner is used and a carrier is not contained. Since the magnetic toner is used, the image quality can be easily influenced by the magnetism of the magnet roller when compared to the image quality obtained by using the two-component developing agent. Since a carrier is not contained, a sufficient effect of agitation cannot be obtained, and the charge amount of the toner is decreased. If the charge amount of the toner is low and the magnetic toner is attracted by the magnetism of the magnet roller, the attraction force of the toner with respect to the charges of the electrostatic latent image is further decreased, and the toner image cannot be developed easily.

For these reasons, in order to improve the developing capability for a low-potential latent image, the content of a magnetic powder per toner particle is decreased, or the addition amount of an antistatic agent is increased. These countermeasures, however, lead to other problems.

First, these countermeasures cause fog to soil an image. Second, the image lacks a long-term stability.

Regarding the first problem of fog, generally, the content of the magnetic powder is inversely proportional to the obtained density, and the addition amount of the antistatic agent is inversely proportional to the fog level. Also, when the density of an image to be obtained is decreased, fog is decreased. Accordingly, in order to obtain an optimal state, the image density and the fog state must be set to intermediate levels. As a result, only a marginally satisfactory image quality as a compromise between the density and fog can be obtained.

Regarding the second problem of the lack of long-term stability in image formation, when the content of the magnetic powder is decreased or the addition amount of the antistatic agent is increased, charging of the toner becomes unstable during use, and the toner is partly charged in the opposite polarity. Then, a lack in long-term stability is caused.

If charging is unstable, as the number of times of printing operations is increased, the image density is undesirably decreased. This leads to a phenomenon in which even if the toner amount is sufficient, the density of the printed image is insufficient. Although this phenomenon is temporarily recovered by replenishing the toner, the image density level is quickly decreased to that obtained before replenishment. In this manner, the density level lacks stability.

The degree of degradation in image quality progresses as the print count increases. Therefore, as the print count increases after exchanging the developing agent, the image quality remarkably deteriorates. Then, even if the toner amount is sufficient, the developing agent must be exchanged. This is a bothersome problem that inevitably occurs, by and large, in the insulating one-component developing agent. This means that the maintenance frequency of the printer must be increased, thereby hindering realization of a printer with expendable supplies (e.g., a developing agent) having long exchange cycles, i.e., a printer requiring less management and maintenance.

The third problem is image non-uniformity.

When the insulating one-component developing agent is used, if an image having a high latent image potential level and a wide area, e.g., a solid black image, is developed, charges on the drum (image carrier 1) are undesirably shifted to the toner particles to inverse the polarity of the charges of the toner. As a result, the toner undesirably attaches to the sleeve 22 of the developing unit.

When the toner attaches to the sleeve 22, the image density of this portion lowers if the corresponding image portion is a solid black image portion and a fog occurs if the corresponding image portion is a white image portion, leading to an image having a remarkably low image quality with many non-uniform density portions. This phenomenon occurs easily when the content of the magnetic powder is decreased.

SUMMARY OF THE INVENTION

It is an object of the present invention to provide an electrostatic electrophotography apparatus of an electrophotography method using an insulating one-component developing method, wherein charging of the magnetic toner is stabilized so that the state of a high image quality free from degradation in image quality and non-uniformities can be obtained over a long period of time, and a developing agent (magnetic toner) suitably used in this apparatus.

In order to achieve the above object, the present invention has an arrangement as follows. Namely, there is provided an electrostatic electrophotography apparatus using a developing agent consisting of a first magnetic toner containing less than 45 wt. % of a magnetic powder and having a comparatively low magnetism, and a second magnetic toner containing not less than 45 wt. % of a magnetic powder and having a comparatively high magnetism, both the first and second magnetic toners being charged with a comparatively low charge amount in the same polarity with a blow-off charge amount of not more than 12 $\mu C/g$ in absolute value, having substantially the same average particle diameters, and being mixed such that the mixture contains 20 to 99 parts by weight of the first magnetic toner and 1 to 80 parts by weight of the second magnetic toner, and developing an electrostatic latent image formed on an image carrier, thereby obtaining an image.

There is also provided an image recording apparatus for developing a latent image, formed on an image carrier by charging, by attaching a developing agent containing toners, thereby obtaining a toner image, transferring the toner image on a recording sheet, and fixing the toner image, thereby recording an image, wherein the developing agent is obtained by mixing a first magnetic toner containing less than 45 wt. % of a magnetic powder and having a comparatively low magnetism and low charge amount (a blow-off charge amount of not more than 12 $\mu C/g$ in absolute value), and a second magnetic toner which has substantially the same particle diameter as that of the first magnetic toner and charge characteristics of the same polarity as that of the first magnetic toner, contains less than 45 wt. % of a magnetic powder, and has a comparatively high magnetism and low charge amount (a blow-off charge amount of not more than 12 $\mu C/g$ in absolute value), with a formulating proportion of 20 to 99 parts by weight of the first magnetic toner and 1 to 80 parts by weight of the second magnetic toner, and a convey means for conveying the developing agent to the image carrier with a magnetism is provided.

A starting developing agent mixed to contain 20 to 99 parts by weight of the first magnetic toner and 1 to 80 parts by weight of the second magnetic toner is supplied to the developing unit first, and thereafter a replenishing developing agent mixed to contain 90 to 100 parts by weight of the first magnetic toner and 0 to 10 parts by weight of the second magnetic toner is used for replenishment.

Furthermore, the toner convey mechanism section of the developing unit is obtained by inserting a rotatable magnet roller in a rotatable sleeve, and the sleeve and the magnet roller are rotated in the directions opposite to each other.

Furthermore, in order to obtain a developing bias to be applied to the sleeve of the toner convey mechanism section, a DC voltage of 0 to 60 V in absolute value is superposed on an alternating electric field of AC 100 to 300 V.

When an insulating one-component toner having a low magnetism is used in development of a low-potential latent image in which the potential of the latent image is 300 V or less in absolute value, although the image density becomes high, fog increases, as described before. When a low-charge toner having a blow-off charge amount of 12 $\mu C/g$ or less in absolute value is used, fog can be slightly suppressed.

Then, however, the image density lowers, and the electrified charges become unstable. The toner is partly charged in the opposite polarity to vary the image density, so a stable image cannot be obtained. Also, the toner partly attaches to the sleeve to cause a non-uniform image.

In order to solve these problems, a developing agent is used, which is obtained by mixing a first magnetic toner containing less than 45 wt. % of a magnetic powder and having a comparatively low magnetism and a second magnetic toner containing less than 45 wt. % of a magnetic powder and having a comparatively high magnetism, both the first and second magnetic toners being charged with a comparatively low charge amount in the same polarity (a blow-off charge amount of not more than 12 $\mu C/g$ in absolute value), having substantially the same average particle diameters, and being mixed such that a mixture contains 20 to 99 parts by weight of the first magnetic toner and 1 to 80 parts by weight of the second magnetic toner.

According to the first effect obtained by this developing agent, the effect of agitation by the magnet roller is increased since the developing agent has a high magnetism. Then, the toner attaching to the sleeve, although in a small amount, to interfere with charging can be removed, and the toner is prevented from attaching heavily to the sleeve when a high-potential latent image, e.g., a solid black image, is developed, leading to a non-uniform image.

According to the second effect, charging between the toners can be stabilized.

The resultant developing agent has a high magnetism to provide a large effect when agitated by the magnet roller. Charging between a high-magnetism toner and a low-magnetism toner is promoted. Unstable charging between the low-magnetism toners particles and charging in the opposite polarity are prevented. Therefore, a stable image quality can be obtained over a long period of time.

A high-magnetism toner contains a large amount of magnetic particles. Therefore, the magnetic material can be easily exposed to the surface of the toner. Triboelectrification occurs between the exposed magnetic material and the low-magnetism toner. Then, the low-magnetism attains a larger charge amount, while the high-magnetism toner is charged in the opposite polarity.

Even if the exposed amount of the contained magnetic material is not very large, the toner containing a large mount of the magnetic material has a low charge amount of 12 $\mu$C/g or less when compared to a toner containing a small amount of a magnetic material. Therefore, when a toner containing a large amount of a magnetic material and a toner containing a small amount of a magnetic material are subjected to triboelectrification with each other, the low-magnetism toner containing a small amount of a magnetic material is charged more intensely. Accordingly, most of the high-magnetism toner containing a large amount of a magnetic material is charged in the opposite polarity, and only a very small amount of the high-magnetism toner is used for development. As a result, the low-magnetism toner has a uniform polarity and is charged stably, thereby providing an image having a high image density and free from fog.

In this case, if the high-magnetism toner is used singly, it has characteristics of being charged in the same polarity as that of the low-magnetism toner. Therefore, very small part of the developing agent is charged in the same polarity as that of the low-magnetism toner while most of the developing agent which is used for development and is thus consumed has a high magnetism and charged in the opposite polarity. Therefore, the toner consumption is very small. If a necessary amount of a toner is supplied to the apparatus before starting the operation, only a very small amount of the toner need be replenished later on.

Usually, the starting developing agent is mixed to contain 20 to 99% of the first toner and 1 to 80% of the second toner. The replenishing developing agent is adjusted to contain 90 to 100% of the first toner and 0 to 10% of the second toner.

In order to obtain a higher image density and a higher durability (long-term high image quality stabilization performance), a developing unit in which both the sleeve and the magnet roller are rotated is employed.

The present invention can be effectively used in an image forming apparatus for developing a low-potential latent image having a potential of 600 V or less in absolute value and especially 300 V or less in absolute value. Even if the present invention is applied to an image forming apparatus for forming a latent image in accordance with ion emission, a long-term high image quality stabilization performance can be obtained. If a developing bias, obtained by superposing a DC voltage of 0 to 60 V in absolute value on an alternating electric field of AC 100 to 300 V, is applied in order to obtain an image free from fog, a better effect can be obtained.

As described above, according to the present invention, there are provided an electrostatic electrophotography apparatus in which charging of the magnetic toner is stabilized and the state of a high image quality free from degradation in image and a non uniformity can be obtained over a long period of time, and a developing agent used in such an apparatus.

In order to achieve the above object, the present invention also has an arrangement as follows. Namely, there is provided an image recording apparatus for developing a latent image, formed on an image carrier by charging, by attaching a developing agent containing toners, thereby obtaining a toner image, transferring the toner image on a sheet, and fixing the toner image, thereby recording an image, wherein the developing agent is obtained by mixing a first magnetic toner containing less than 45 wt. % of a magnetic powder and having a comparatively low magnetism and characteristics of being charged in an opposite polarity to that of an electrostatic latent image, and a second magnetic toner containing not less than 45 wt. % of a magnetic powder and having a comparatively high magnetism with conductive particles present on a surface thereof, with a formulating proportion of 10 to 99 parts by weight of the first magnetic toner and 1 to 90 parts by weight of the second magnetic toner, and the apparatus comprises a convey means for conveying the developing agent to the image carrier with a magnetism.

In this arrangement, the developing agent is mixed to contain 10 to 99 parts by weight of the first magnetic toner containing less than 45 wt. % of a magnetic powder and having a comparatively low magnetism and 1 to 90 parts by weight of the second magnetic toner containing not less than 45 wt. % of a magnetic powder and having a comparatively high magnetism with conductive particles present on a surface thereof. The convey means attracts the developing agent with the magnetism and conveys it to the image carrier, thereby developing the electrostatic latent image on the image carrier.

In order to develop a low-potential latent image having a potential of 600 V or less or 300 V or less in absolute value, generally, an insulating one-component toner having a low magnetism is used as the developing agent. In this case, although the image density becomes high, fog increases, as described above. In order to suppress the fog, even if a little, a low-charge toner having a blow-off charge amount of 12 $\mu$C/g or less in absolute value is used. However, this decreases the addition amount of the antistatic agent and the like. Then, charging becomes unstable, and the toner is partly positively charged to vary the image density. A stable image cannot thus be obtained or the toner is kept attached to the sleeve, causing an image non-uniformity.

In order to solve these problems, the present invention uses a developing agent obtained by mixing the first magnetic toner containing not more than 45 wt. % of a magnetic material and having a comparatively low magnetism, and the second magnetic toner containing not less than 45 wt. % of a magnetic material and having a comparatively high magnetism with conductive particles present on a surface thereof, with a formulating proportion in a range of 10:90 to 99:1.

As a result, the following effects are obtained.

According to the first effect, since the toner has a high magnetism, the effect of agitation of the toner by the magnet roller is increased. When the effect of agitating the toner is increased, even if the toner slightly attaches to the sleeve to interfere with charging, such a toner is removed by agitation. Heavy attachment of the toner to the sleeve, that occurs when a high-potential latent image, e.g., a solid black image, is developed, thereby causing a non-uniform image, can be prevented since the effect of toner agitation is increased.

According to the second effect, charging between the toners can be stabilized.

This is caused by the following facts. That is, when a low-magnetism toner is mixed with a high-magnetism toner, the effect of agitation by the magnet roller is increased, thereby promoting charging between toners. Also, since the conductive particles are exposed to the surface, the charges of the opposite polarity are removed through the conductive particles, so that stable toner charging can be obtained, thereby preventing unstable charging between low-magnetism toner particles or charging in the opposite polarity.

As a result, the low-magnetism toner is stably charged in a uniform polarity, and an image having a high image density and free from fog can be obtained.

The conductive particles often cause a magnetic material, e.g., magnetite, to be exposed to the toner particles. Even if they do not serve to expose a magnetic material to the toner particles, if the toner contains a rather large amount of a magnetic material, e.g., 45 wt. % or more of a magnetic material, the magnetic material is usually often exposed to the surface of the toner.

In another case, carbon may be added to the surface of the toner. In this case, since the second high-magnetism toner contains a large amount of a magnetic material, it is strongly attracted by the magnetic roller, and hardly used for development. In addition, such a second high-magnetism toner is not charged at all, or is charged with a very small charge amount. Even when it is charged, the second high-magnetism toner is charged in the opposite polarity to that of the first magnetic toner, and thus it has the same polarity as that of the potential of the latent image, minimizing the toner consumption. Therefore, if a necessary amount of a toner is supplied before starting the operation (in the initial stage), only the first low-magnetism toner or a very small amount of the second high-magnetism toner need be replenished later on.

Usually, a mixture containing 30 to 99 wt. % of the first toner and 1 to 70 wt. % of the second toner is supplied to the developing unit first as the starting developing agent (developing agent which is filled in the initial stage). For replenishment later on, a replenishing developing agent adjusted to contain 90 to 100 wt. % of the first toner and 0 to 10 wt. % of the second toner may be used.

As has been described above, according to the present invention, there is provided an electrostatic electrophotography apparatus in which charging of the magnetic toner is stabilized so that a high-quality image free from a degradation in image or a non uniformity can be maintained over a long period of time.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a diagram for explaining an electrostatic latent image formed on an image carrier;

FIG. 5 is a graph showing a change in image density during continuous printing;

FIG. 7 is a table for explaining the effect of Example 2;

FIG. 8 is a table for explaining the effect of Example 3;

FIG. 9 is a table for explaining the effect of Example 4;

FIG. 10 is a table showing the formulating proportion of the respective toners used in Example 5;

FIG. 11 is a table showing a change in density and a print count obtained when printing is performed by using the respective toners used in Example 5;

FIG. 12 is a table showing the potential of the latent image in electrostatic electrophotography apparatuses used in Example 6;

FIG. 13 is a table showing electrostatic electrophotography apparatuses used in Example 6 and the state of the printed image;

FIG. 14 is a table for explaining Example 7 and shows the respective bias values for the developing unit used in Example 7 and the state of the printed image;

FIG. 15 is a table for explaining the effect of Example 9;

FIG. 16 is a table for explaining the effect of Example 10;

FIG. 17 is a table for explaining the effect of Example 11;

FIG. 18 is a table showing the formulating proportion of the respective toners used in Example 12;

FIG. 19 is a table for explaining the effect of Example 12;

FIG. 20 is a table showing the potential of the latent image in the electrostatic electrophotography apparatuses used in Example 13;

FIG. 21 is a table showing a change in density and a print count obtained when printing is performed by using the respective toners used in Example 13;

FIG. 22 is a table for explaining Example 14 and shows the respective bias values for the developing unit used in Example 14 and the state of the printed image;

FIG. 24 is a diagram for explaining the structure of a toner convey mechanism section of a developing unit; and FIG. 25 is a diagram for explaining the structure of a toner convey mechanism section of a developing unit.

DETAILED DESCRIPTION OF THE PREFERRED EMBODIMENTS

The preferred embodiment of the present invention will be described.

(Arrangement of Apparatus)

Figure 1:
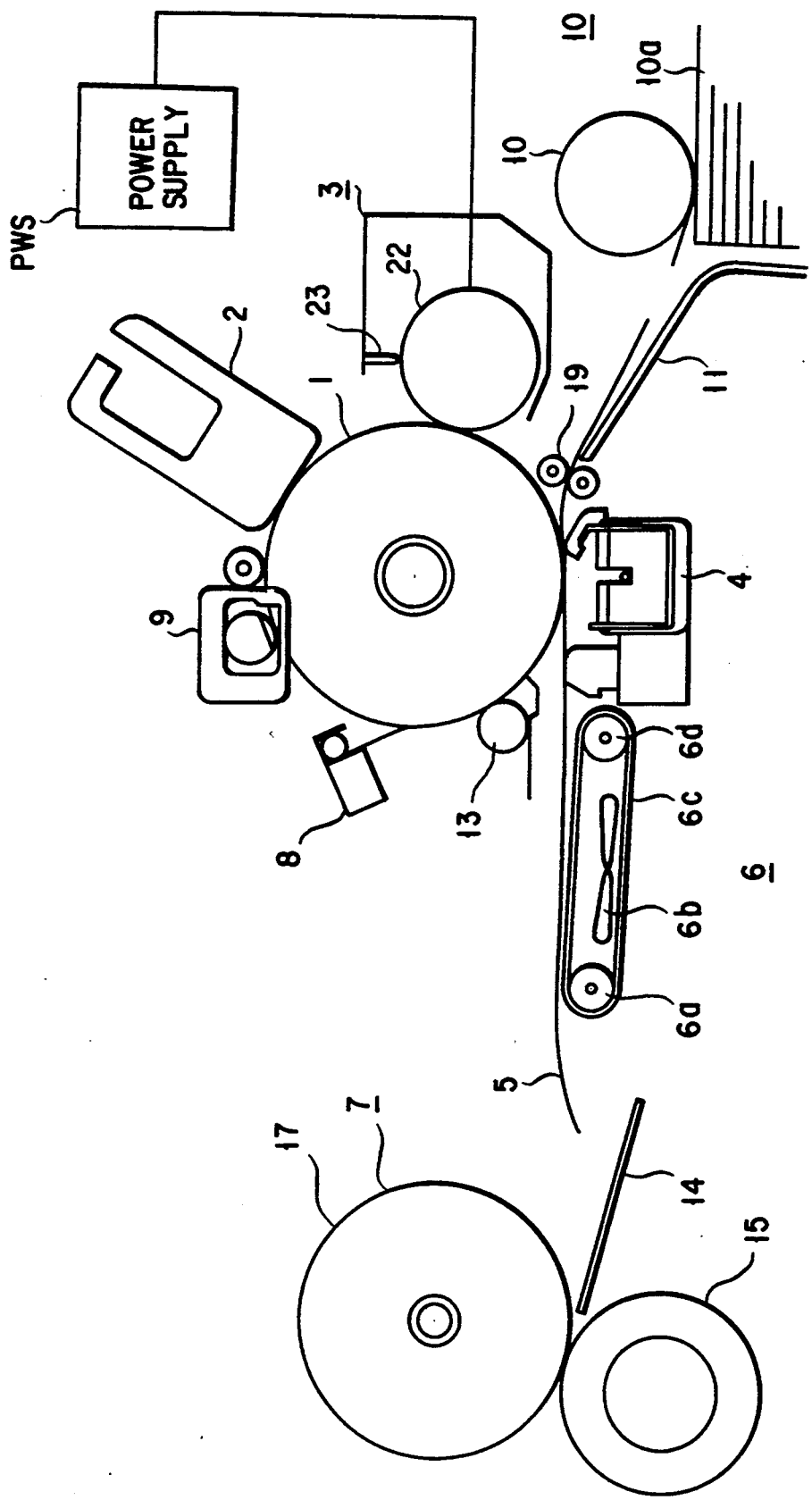
FIG. 1 is a diagram of an electrostatic electrophotography apparatus according to the embodiment of the present invention.

FIG. 1 is a block diagram of an ionography type electrostatic electrophotography apparatus according to an embodiment of the present invention. The arrangement of FIG. 1 will be described. An image carrier 1 uses a dielectric drum. The image carrier 1 constituted by the dielectric drum is obtained by forming a thin resin dielectric layer on the surface of an aluminum drum. In the case of a laser beam printer, a photoconducting drum is used as the image carrier.

A latent image forming unit 2 forms an electrostatic latent image on the image carrier 1. For example, an ion cartridge is used as the latent image forming unit 2.

A developing unit 3 adopts the developing method of the present invention. The developing unit 3 develops the electrostatic latent image, formed on the image carrier 1 by the latent image forming unit 2, to form a toner image.

The developing unit 3 incorporates a toner convey mechanism constituted by a magnet roller 21 and a sleeve 22, as has been described with reference to FIGS. 24 and 25. The developing unit 3 is provided with a developing bias power supply PWS for applying a bias voltage to the sleeve 22.

A transfer unit 4 transfers the toner image on the image carrier 1 onto a sheet 5 and generates positive or negative corona ions. The corona ions are emitted toward the image carrier 1 through the sheet 5, thereby charging the sheet 5. The toner on the image carrier 1 is attracted by the charged sheet 5, thereby transferring the toner image.

A paper convey unit 6 conveys the sheet 5, having the non-fixed toner image transferred by the transfer unit 4 thereon, to a fixing unit 7. The fixing unit 7 supplies heat to the sheet 5 conveyed to it, thereby fixing the non-fixed toner image on the sheet 5.

A cleaning unit 8 is made of a stainless steel blade and scrapes off the remaining toner on the image carrier 1 which is not transferred to the recording sheet 5. An eraser 9 erases the electrostatic latent image formed on the image carrier 1.

A paper feed unit 10 has a sheet cassette 10a and a pickup roller 10b. The recording sheet cassette 10a stores cut sheets (standard sheets). The pickup roller 10b picks up the sheets 5 one by one from the sheet cassette 10a. The paper feed unit 10 feeds out the sheets 5 one by one toward a transfer section as a region where the image carrier 1 and the transfer unit 4 are arranged to oppose each other.

A paper guide 11 of a paper feed section guides the sheet 5 fed by the paper feed unit 10 to the transfer section. A collecting unit 13 collects the toner scraped by the cleaning unit 8. A guide 14 guides the sheet 5, on which the non-fixed toner image is transferred, to the fixing unit 7.

The image carrier 1 has a drum shape, and the latent image forming unit 2, the developing unit 3, the transfer unit 4, the toner collecting unit 13, the cleaning unit 8, and the eraser 9 are arranged at predetermined positions around the image carrier 1. As the image carrier 1 is rotated, the circumferential surface of the image carrier 1 sequentially passes the positions of these units.

The paper guide 14 of the paper feed section is provided to extend from the outlet of the convey path of the paper convey unit 6 to the inlet of the transfer section, and the paper guide 11 of the paper feed section is provided to extend from the paper outlet of the paper feed unit 10 to the inlet of the transfer section and from the option feeder to the inlet of the transfer section. The paper guide 11 of the paper feed section occupies a relatively large space for paper slackening, so that it can correct the posture of the sheet 5 by slackening the sheet 5.

The fixing unit 7 consists of a heat roll 17 and a pressure roller 15. The heat roll 17 applies heat to the sheet 5 having a non-fixed toner image, in order to fuse the toner on the sheet 5, and brings the fused toner into tight contact with the sheet 5. The pressure roller 15 sandwiches the sheet 5 together with the heat roll 17 and conveys the sheet 5 while applying pressure to it. The sheet 5 conveyed by the paper convey unit 6 is then conveyed while being urged against the heat roll 17 by the pressure roller 15, thereby fixing the toner image on the sheet 5.

In this embodiment, the latent image forming unit 2 is of the ionography type.

The latent image forming unit 2 has the same structure as that employed in Jpn. Pat. Appln. KOKOKU Publication No. 2-62862. The outline of the ion head used as the latent image forming unit 2 is as shown in FIGS. 2 and 3.

Figure 2:
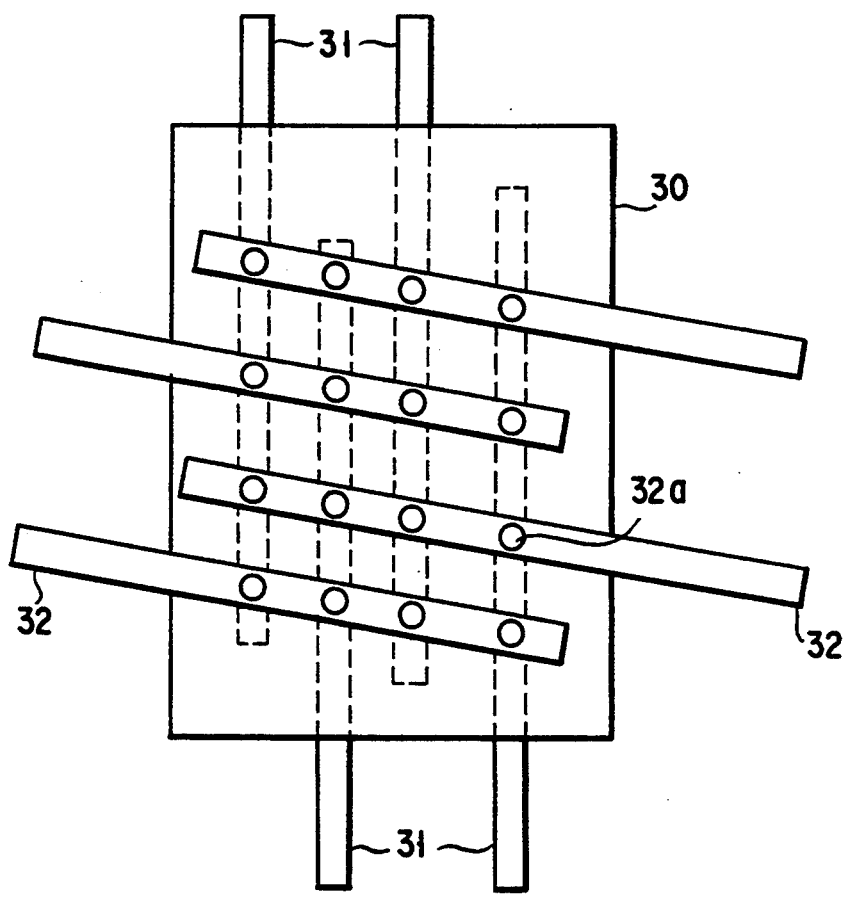
FIG. 2 is a view for explaining the outline of a latent image forming unit (ion head) 2 used in the electrostatic electrophotography apparatus of the present invention.
Figure 3:
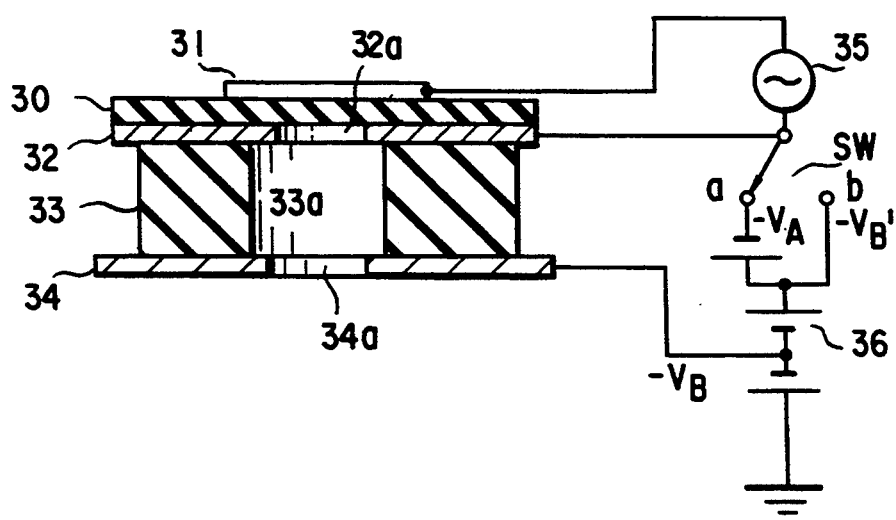
FIG. 3 is a diagram for explaining the outline of the latent image forming unit (ion head) 2 used in the electrostatic electrophotography apparatus of the present invention.

FIG. 2 is a plan view of the ion head seen from the ion emission surface side, and FIG. 3 is a partially enlarged sectional view of the same. The structure shown in FIGS. 2 and 3 will be described. An insulating member 30 is a plate-like insulating member serving also as an ion head support board. A plurality of belt-like line electrodes 31 are aligned in the horizontal direction on one surface of the insulating member 30. A plurality of finger electrodes 32 as belt-like electrodes are aligned in the vertical direction on the other surface of the insulating member 30.

The line electrodes 31 and the finger electrodes 32 intersect at a predetermined angle. A hole 32a having a predetermined diameter is formed at each intersecting portion of the line electrodes 31 and the finger electrodes 32 in order to form an ion generating section at each intersecting portion.

An insulating layer 33, having hole portions 33a with a larger diameter than that of the corresponding holes 32a at portions corresponding to the holes 32a, is disposed on the finger electrodes 32. The insulating layer 33 is made of, e.g., a synthetic resin. Belt-shaped screen electrodes 34 are formed on the insulating layer 33. Holes 34a corresponding to the holes 32a of the finger electrodes 32 are formed in the screen electrodes 34. The belt-shaped screen electrodes 34 are disposed to cover all the intersecting portions of the line electrodes 31 and the finger electrodes 32. The hole portions 33a formed in the insulating layer 33 serve as ion emission openings. The hole portions 33a serving as the ion emission openings are formed to obtain a resolution of, e.g., 300 dpi (dots per inch).

The ion head having this arrangement is arranged such that its screen electrodes 34 side serving as the ion emission surface opposes the image carrier 1 (dielectric drum) at a predetermined small gap. As described above, this dielectric drum is constituted by forming a dielectric layer on a cylindrical support made of, e.g., aluminum, and is rotated at a predetermined speed.

The operation of forming an electrostatic latent image by the ion head will be described. A high AC voltage of, e.g., about 2,500 V and 1 MHz, is applied by an RF high AC power supply 35 across the line electrodes 31 and the finger electrodes 32 of the ion head having the above arrangement, as shown in FIG. 3. A negative voltage $-V_A$ is applied to the finger electrodes 32 through a selector switch SW, and a negative voltage $-V_B$ is applied to the screen electrodes 34. The negative voltage $-V_B$ applied to the screen electrodes 34 has a smaller absolute value than that of the negative voltage $-V_A$ applied to the finger electrodes 32.

When the high AC voltage is applied across the line electrodes 31 and the finger electrodes 32, electric discharge occurs at the hole 32a portions of the finger electrodes 32. The atmospheres in the vicinities of the electric discharge portions are ionized by the electric discharge at the hole 32a portions.

As shown in FIG. 3, when the selector switch SW is switched to the contact b side, the negative voltage $-V_B$ is applied to the screen electrodes 34. Meanwhile, a negative voltage $-V_B'$ is applied to the finger electrodes 32. Hence, the potential gradient between the screen electrodes 34 and the finger electrodes 32 is directed from the latter to the former. Accordingly, of the ions generated in the vicinities of the finger electrodes 32, negative ions stay in the vicinities of the finger electrodes 32.

When the selector switch SW is switched to the contact a side, the negative voltage $-V_A$ is applied to the finger electrodes 32. Since the absolute values of the negative voltages $-V_A$ and $-V_B$ satisfy a relation $V_A > V_B$, this time, the potential gradient between the screen electrode 34 and the finger electrodes 32 is directed from the former to the latter.

Therefore, the negative ions staying in the vicinities of the finger electrodes 32 are accelerated toward the screen electrodes 34 by this potential gradient and emitted from the holes 34a toward the dielectric drum 1. The emitted negative ions are held on the dielectric drum 1 to form a latent image in units of dots.

More specifically, whether the ions are to be emitted from the holes 34a of the screen electrodes 34 can be controlled by the switching operation, and a latent image in units of dots for image formation can be formed by this control operation.

In the electrophotography apparatus having the arrangement as shown in FIG. 1, an electrostatic latent image is formed on the image carrier 1 by the latent image forming unit 2 while rotating the image carrier 1. A portion of the image carrier 1 on which the electrostatic latent image is formed is developed with the toner as it passes the position of the developing unit 3. The sleeve 22 of the developing unit 3 is close to the image carrier 1. When the toner attaching to the surface of the sleeve 22 is attracted by the charges of the latent image to shift to the image carrier 1 side, the latent image on the image carrier 1 is developed.

A sheet 5 picked up from the paper feed unit 10 and conveyed to the image carrier 1 is corona-charged at the position of the transfer section (i.e., the portion where the image carrier 1 and the transfer unit 4 oppose each other), thereby attracting the toner on the surface of the image carrier 1.

Then, the non-fixed toner image is transferred to one side of the sheet 5. When the recording sheet 5 passes the position of the fixing unit 7, the toner image is thermally fixed on the sheet 5 by the heat of the fixing unit 7, thereby completing printing.

The basic operation of this apparatus is as described above. In the present invention, the magnetic toner serving as the developing agent has a formula to be described below in order to improve the state of the toner image obtained by developing a latent image. The magnetic toner used as the developing agent in the present invention is obtained by mixing two types of magnetic toners in which the amounts of the resin and the magnetic material are different.

The magnetic toner used in the present invention will be described in detail.

EXAMPLE 1

As the first magnetic toner, a magnetic one-component toner which consisted of about 65 wt. % of a resin and about 35 wt. % of a magnetic material, had a charge amount of $+8$ $\mu$C/g and an average particle diameter of 13 $\mu$m, and had a nature of being charged positively, was prepared.

As the second magnetic toner, a magnetic one-component toner which consisted of about 45 wt. % of a resin and about 55 wt. % of magnetic material, had a charge amount of $+8$ $\mu$C/g and an average particle diameter of 12 $\mu$m, and had a nature of being charged positively was prepared.

Of the first and second magnetic toners, 80 parts by weight of the first magnetic toner and 20 parts by weight of the second magnetic toner were weighed and mixed by agitation in a ball mill for 1 hour, thereby preparing a starting developing agent (developing agent to be filled in the developing unit 3 first).

To determine the charge amount, a Blow-Off Powder Charge Amount Measuring Unit available from Toshiba CHEMICAL CORP. was used, and 0.2 g of a mixture, prepared such that the mixing ratio of the toner and a ferrite carrier (KBN-100 available from Hitachi Metals, Ltd.), was 5 wt. %: 95 wt. % (5 parts by weight of toner and 95 parts by weight of ferrite carrier), were weighed. The mesh of the Faraday cage was 400 mesh in accordance with SuS, and the blow-off time was set to 30 sec. The atmosphere at this time had a temperature of 23° C. and a humidity of 60%.

More specifically, 0.2 g of the mixture of the toner and the ferrite carrier were put in the Faraday cage mounted with a stainless steel mesh member having 400 mesh. Blow-off was performed for 30 sec. with a nitrogen gas having an adjusted pressure of 1 kg/cm$^2$. Then, the charge amount was measured.

Aside from the above mixture, 99 parts by weight of the first magnetic toner and 1 part by weight of the second magnetic toner were weighed and mixed by agitation in a ball mill for 1 hour, thereby preparing a replenishing developing agent.

This developing agent was employed in an electrostatic electrophotography apparatus as shown in FIG. 1. The respective preset conditions and operation of the electrostatic electrophotography apparatus were as follows.

Regarding an image carrier 1, using an aluminum drum having a diameter of 43 mm, a resin was coated on the surface of this aluminum drum to a thickness of 40 $\mu$m and dried. A latent image forming unit 2 was of the ionography type, as described above.

As described above, the latent image forming unit (i.e., the ion head) 2 applies an AC voltage of 2,500 Vp-p at 1 MHz across matrix electrodes 31 and 32 through an insulating member 30, by an AC power supply 35 of a power supply 20, as shown in FIG. 3. When an ion extracting electric field is applied across screen electrodes 34 having ion emission openings (holes 34a), formed to have a resolution of 300 dpi, and the electrodes 32 by a power supply 36 in the power supply 20, an electrostatic latent dot image 37 can be formed on the image carrier 1 (dielectric drum) as shown in, e.g., FIG. 4. Note that the latent image of this example has negative polarity.

The latent image formed on the image carrier 1 in this manner is developed by a developing unit 3 arranged close to the image carrier 1, to form a toner image.

The developing unit 3 used in this apparatus has a toner convey mechanism in which both a sleeve 22 and a magnet roller 21 rotate, as shown in FIG. 25. The magnet roller 21 has eight poles with a magnetism of 600 Gs, and the sleeve 22 is made of a stainless steel cylinder having a diameter of 20 mm.

In this case, the sleeve 22 was rotated at 250 mm/sec. in the same direction as the dielectric drum, and the magnet roller 21 was rotated at 2,500 rpm. in the opposite direction to the sleeve 22. The magnetic toner was attracted by the magnetism of the magnet roller 21 to attach to the circumferential surface of the sleeve 22, while the sleeve 22 was rotated in the opposite direction to the magnet roller 21. As a result, the particles of the magnetic toner on the circumferential surface of the sleeve 22 were rotated on the sleeve 22, and were thus triboelectrified by friction between them.

The gap between the image carrier (dielectric drum) 1 and the sleeve 22 was set to 0.2 mm, and the gap between the sleeve 22 and a blade 23 was set to 0.15 mm to form a thin toner layer on the sleeve 22. A DC voltage of $-20$ V was applied as a bias by a developing bias power supply PWS to the sleeve 22.

By the developing unit 3 set to have these conditions, the charged toner on the sleeve 22 transits to the latent image on the image carrier (dielectric drum) 1, thereby developing the latent image. The toner image obtained by this development is transferred to a sheet 5 by a transfer unit 4.

In this example, the transfer unit 4 is a corona generating unit to which a negative high voltage is applied. A fixing unit 7 comprises a roll that generates heat. The heat temperature is adjusted to 190° C. in this example.

An eraser 9 restores the potential on the image carrier 1 to a neutral potential (50 V or less in absolute value). An AC corona generator is used as the eraser 9.

When the starting developing agent was supplied to the developing unit 3 of this electrostatic electrophotography apparatus and an image was output, an image having a high resolution was obtained. The image density obtained at this time was 1.4, and no fog was observed.

Subsequently, when entirely solid black images were output, the image density was not changed. Hence, solid black printouts having a uniform density and a high image quality were continuously obtained. Even when a white image was output immediately after solid black images were printed, an abnormality, e.g., fog or an after-image did not occur, and the printed white image was in a good condition. Therefore, it was obvious that a printout having a high image quality can be obtained.

The replenishing developing agent prepared as described above was replenished in the image forming apparatus using this starting developing agent, and 400,000 sheets were printed. During the printing operation of 400,000 sheets, the drum (image carrier 1) and the developing unit were not exchanged, and accordingly the developing agent was not exchanged.

FIG. 5 shows a change in image density during this continuous printing.

As is seen from FIG. 5, in this example, the black density was about 1.4 and was not reduced below 1.3. The white density was 0.06 with no change at all.

When the printing operation of 400,000 sheets was completed, the image density was 1.4, and no fog was observed. The line width was 150 μm. A solid black image with a high reproducibility was also obtained.

From the above result, it is obvious that the developing agent of this example does not change the image density and has a high durability.

When the toner transited onto the dielectric drum (image carrier) 1 was measured by the Blow-Off Charge Amount Measuring Unit under the conditions described above, a reading of $+20$ μC/g was obtained, indicating that the toner was positively charged and the charge amount was high.

The above image forming apparatus was partly modified. When a positive latent image, which is of the opposite polarity to that of an ordinary latent image, was formed, and the toner transited onto the dielectric drum was measured by the Blow-Off Charge Amount Measuring Unit, $-6$ μC/g was obtained, indicating that the toner was negatively charged.

The respective toners were collected, and their contents of the magnetic material were examined. The positively charged toner contained about 35 wt. % of a magnetic material, and the negatively charged toner contained about 55 wt. % of a magnetic material.

From this result, since the first magnetic toner having a small magnetic material content is positively charged, as an ordinary magnetic toner is, and the charge amount is increased, it is estimated that the charge amount of the opposite polarity is decreased and that a stable charge state is obtained. It is also estimated that the second magnetic toner having a large magnetic material content is negatively charged (to the opposite polarity), thereby contributing to stabilization of charging of the first magnetic toner.

It is assumed that a high image quality stabilizing performance for maintaining a stable image over a long period of time can thus be obtained.

As a comparative example, the following experiment was conducted. In this comparative example, a one-component toner containing only the first magnetic toner prepared in Example 1 was supplied to the electrostatic electrophotography apparatus of this embodiment, and a printing operation was performed. As a result, although the image density was 1.4, fog was observed. Regarding solid black images, an image nonuniformity occurred starting from the second half of the first sheet. As another comparative example, a one-component toner containing only the second magnetic toner prepared in Example 1 was supplied to the electrostatic electrophotography apparatus, and a printing operation was performed. As a result, only an image density as low as 0.9 was obtained, and the apparatus could not be used as a printer.

EXAMPLE 2

Example 2 of the present invention will be described.

As the first magnetic toners, "toner #1" to "toner #5" were prepared.

"Toner #1" is a magnetic one-component toner containing about 20 wt. % of a magnetic material, and having a charge amount of $+5$ μC/g and an average particle diameter of 12 μm. "Toner #2" is a magnetic one-component toner containing about 33 wt. % of a magnetic material, and having a charge amount of $+3$ μC/g and an average particle diameter of 13 μm. "Toner #3" is a magnetic one-component toner containing about 40 wt. % of a magnetic material, and having a charge amount of $+2$ μC/g and an average particle diameter of 12 μm. "Toner #4" is a magnetic one-component toner containing about 45 wt. % of a magnetic material, and having a charge amount of $+10$ $\mu$C/g and an average particle diameter of 12 $\mu$m. "Toner #5" is a magnetic one-component toner containing about 50 wt. % of a magnetic material, and having a charge amount of +12 $\mu$C/g and an average particle diameter of 12 $\mu$m.

As the second magnetic toner, a magnetic one-component toner which contained about 55 wt. % of magnetic material, had a charge amount of +3 $\mu$C/g and an average particle diameter of 12 $\mu$m, and similarly had a nature of being charged positively was prepared.

80 parts by weight of each first toner and 20 parts by weight of the second toner were weighed and mixed by agitation in a ball mill for 1 hour, thereby preparing five types of developing agents ("toner #6" to "toner #10"). A printing operation was performed by employing these developing agents as initial developing agents in an electrostatic electrophotography apparatus identical to that used in Example 1. As replenishing developing agent use was made of a toner consisting of 99 parts by weight of the first toner and one part by weight of the second toner, stirred together in the same way as the initial developing agents.

The evaluation items are the image density, fog, and reproducibility of a solid black image in an initial image, and a change in image density obtained when the printing operation is performed for a long period of time. Examinations concerning these evaluation items were made. FIG. 7 shows the result. In this case, note that a printed image obtained in the initial printing operation is called an initial image, and that a printed image obtained until 400,000 sheets are printed is called a durability image.

As is apparent from FIG. 7, in the comparative examples, all the toners had a problem in the initial image, e.g., the image density or fog, or had a change in long-term image density. However, in the case of Example 2 of the present invention, all the toners had an improvement both in the initial image and the durability image. Especially, with the toners each having a magnetic material content of 45 wt. % or less, a high-quality image was obtained.

EXAMPLE 3

In Example 3, as the first magnetic toner, a positively chargeable magnetic one-component toner which consisted of about 65 wt. % of a resin and about 35 wt. % of a magnetic material, and had a charge amount of +6 $\mu$C/g and an average particle diameter of 13 $\mu$m was prepared. As the second magnetic toners, "toner #11" to "toner #15" as follows were prepared.

Of the second magnetic toners, "toner #11" is a magnetic one-component toner containing about 35 wt. % of a magnetic material, and having a charge amount of −5 $\mu$C/g and an average particle diameter of 12 $\mu$m. "Toner #12" is a magnetic one-component toner containing about 45 wt. % of a magnetic material, and having a charge amount of +8 $\mu$C/g and an average particle diameter of 11 $\mu$m. "Toner #13" is a magnetic one-component toner containing about 50 wt. % of a magnetic material, and having a charge amount of +15 $\mu$C/g and an average particle diameter of 12 $\mu$m. "Toner #14" is a magnetic one-component toner containing about 55 wt. % of a magnetic material, and having a charge amount of +8 $\mu$C/g and an average particle diameter of 12 $\mu$m. "Toner #15" is a magnetic one-component toner containing about 65 wt. % of a magnetic material, and having a charge amount of +2 $\mu$C/g and an average particle diameter of 15 $\mu$m.

80 parts by weight of the first magnetic toner and 20 parts by weight of each second magnetic toner were weighed and mixed by agitation in a ball mill for 1 hour, thereby preparing five types of developing agents (toners #16 to #20).

A printing operation was performed by employing these developing agents as initial developing agents in an electrostatic electrophotography apparatus identical to that used in Example 1. As replenishing developing agent use was made of a toner consisting of 99 parts by weights of the first toner and one part by weight of the second toner, stirred together in the same way as the initial developing agents. As a comparative example, a printing operation was performed by employing a developing agent (to be referred to as "toner #21") containing only the first magnetic toner described above in an electrostatic electrophotography apparatus identical to that used in Example 1.

Examinations concerning evaluation items including the image density, fog, and reproducibility of a solid black image in an initial image, and a change in image density as a long-term image quality stabilization performance were made. FIG. 8 shows the result. In this case, note that a printed image obtained in the initial printing operation is called an initial image, and that a printed image obtained until 400,000 sheets are printed is called a durability image, in the same manner as in Example 2.

As is apparent from FIG. 8, in the comparative examples, the toner had a problem in the initial image, e.g., the image density, fog, or reproducibility of the solid black image, or had a change in long-term image density as the long-term stability performance.

On the other hand, in the case of Example 3 of the present invention, all the toners had an improvement both in the initial image and the durability image. In addition, of the second toners, with toners each having a magnetic material content of 45 wt. % or more and a relatively low charge amount, i.e., a blow-off charge amount of 12 $\mu$C/g or less, an image having high evaluations in all the items was obtained.

EXAMPLE 4

In Example 4, as the first magnetic toner, a positively chargeable magnetic one-component toner which consisted of about 65 wt. % of a resin and about 35 wt. % of a magnetic material, and had a charge amount of +8 $\mu$C/g and an average particle diameter of 13 $\mu$m was prepared. As the second magnetic toner, a positively chargeable magnetic one-component toner which consisted of about 45 wt. % of a resin and about 55 wt. % of a magnetic material, and had a charge amount of +8 $\mu$C/g and an average particle diameter of 12 $\mu$m was prepared.

10, 20, 50, 80, 90, 95, and 99 parts by weight of the first magnetic toner were separately weighed, and 90, 80, 50, 20, 10, 5, and 1 parts by weight of the second magnetic toner were separately weighed. The weighed first and second magnetic toners were respectively mixed by agitation in a ball mill for 1 hour, thereby preparing developing agents. The prepared developing agents will be referred to as "toner #22", "toner #23", "toner #24", "toner #25", "toner #26", "toner #27", and "toner #28", respectively.

A printing operation was performed by separately employing these developing agents in an electrostatic electrophotography apparatus identical to that used in Example 1. As comparative examples, a printing operation was performed by employing a developing agent (to be referred to as "toner #29") containing only the first magnetic toner described above, and a developing agent (to be referred to as "toner #30") used as an initial developing agent and containing only the second magnetic toner in an electrostatic electrophotography apparatus identical to that used in Example 1. As replenishing developing agent use was made of a toner consisting of 99 parts by weight of the first toner and one part by weight of the second toner stirred together in the same way as the initial developing agent.

Examinations concerning evaluation items including the image density, fog, and reproducibility of a solid black image in an initial image, and a change in image density as a long-term image quality stabilization performance were made. FIG. 9 shows the result.

As is apparent from FIG. 9, in the comparative examples, the toners had a problem in the initial image, e.g., fog or reproducibility of the solid black image, or had a change in image density as the long-term stability performance.

On the other hand, in the case of Example 4 of the present invention, all the toners had an improvement both in the initial image and the durability image. In addition, with the developing agents "toner #23" to "toner #27" having 5 to 80 parts by weight of the second toner, images having high evaluations in all the items were obtained.

EXAMPLE 5

In Example 5, as the first magnetic toner, a positively chargeable magnetic one-component toner which consisted of about 65 wt. % of a resin and about 35 wt. % of a magnetic material, and had a charge amount of $+8$ $\mu C/g$ and an average particle diameter of 13 $\mu m$ was prepared. As the second magnetic toner, a magnetic one-component toner which consisted of about 45 wt. % of a resin and about 55 wt. % of a magnetic material, had a charge amount of $+8$ $\mu C/g$ and an average particle diameter of 12 $\mu m$, and similarly had a nature of being charged positively was prepared.

80 parts by weight of the first magnetic toner were weighed and agitated in a ball mill for 1 hour, thereby preparing a starting developing agent.

Aside from the above starting developing agent, nine different amounts were weighed from each of the first and second magnetic toners, as shown in FIG. 10, and mixed by agitation in a ball mill for about 1 hour, thereby preparing nine replenishing developing agents. The obtained replenishing developing agents will be referred to as "toner #31", "toner #32", "toner #33", "toner #34", "toner #35", "toner #36", "toner #37", "toner #38", and "toner #39".

A printing operation was performed by employing the prepared starting developing agent in an electrostatic electrophotography apparatus identical to that used in Example 1. A continuous printing operation was performed by this electrostatic electrophotography apparatus while separately replenishing the above replenishing developing agents. FIG. 11 shows a change in image density during continuous printing which is obtained following the same procedures as in Example 1.

From the above result, it is obvious that if the content of the first toner (having a low magnetic material content) is set to 70 parts by weight or more, the image density is comparatively constant in continuous running, and that if the content of the first toner is set to 90 parts by weight or more, substantially no change occurs in the image density, and a stable image can be obtained.

EXAMPLE 6

In Example 6, a printing operation was performed using two types of electrostatic electrophotography apparatuses A and B by employing the developing agent used in Example 1.

Figure 6:
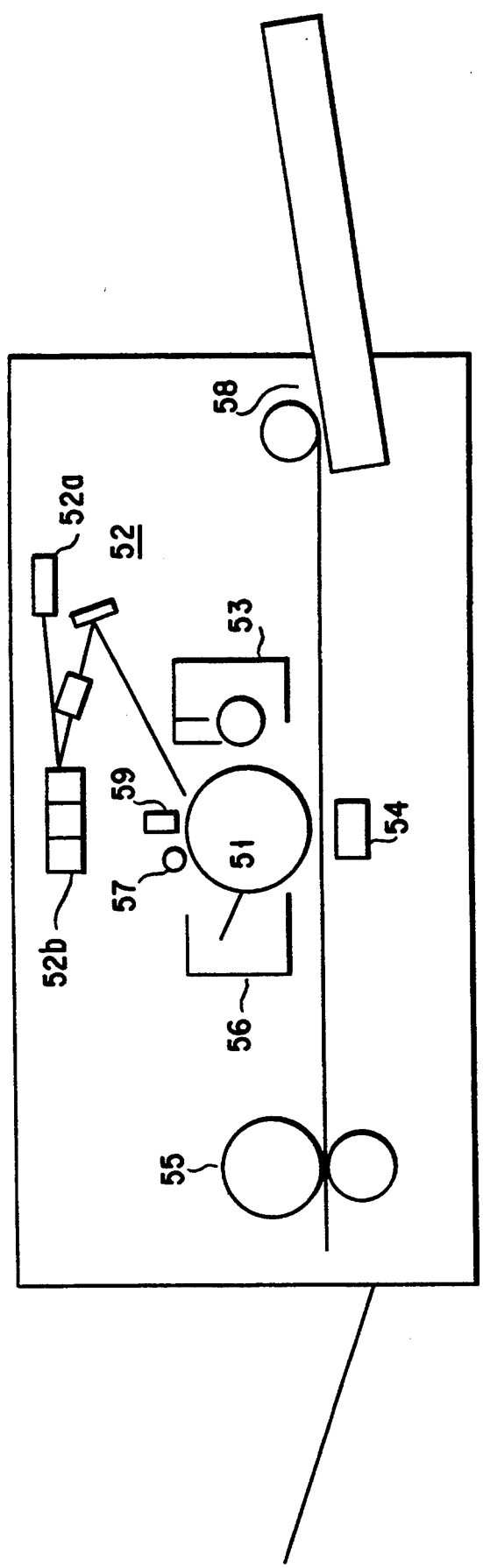
FIG. 6 is a view showing an arrangement of a laser beam printer.
Figure 23:
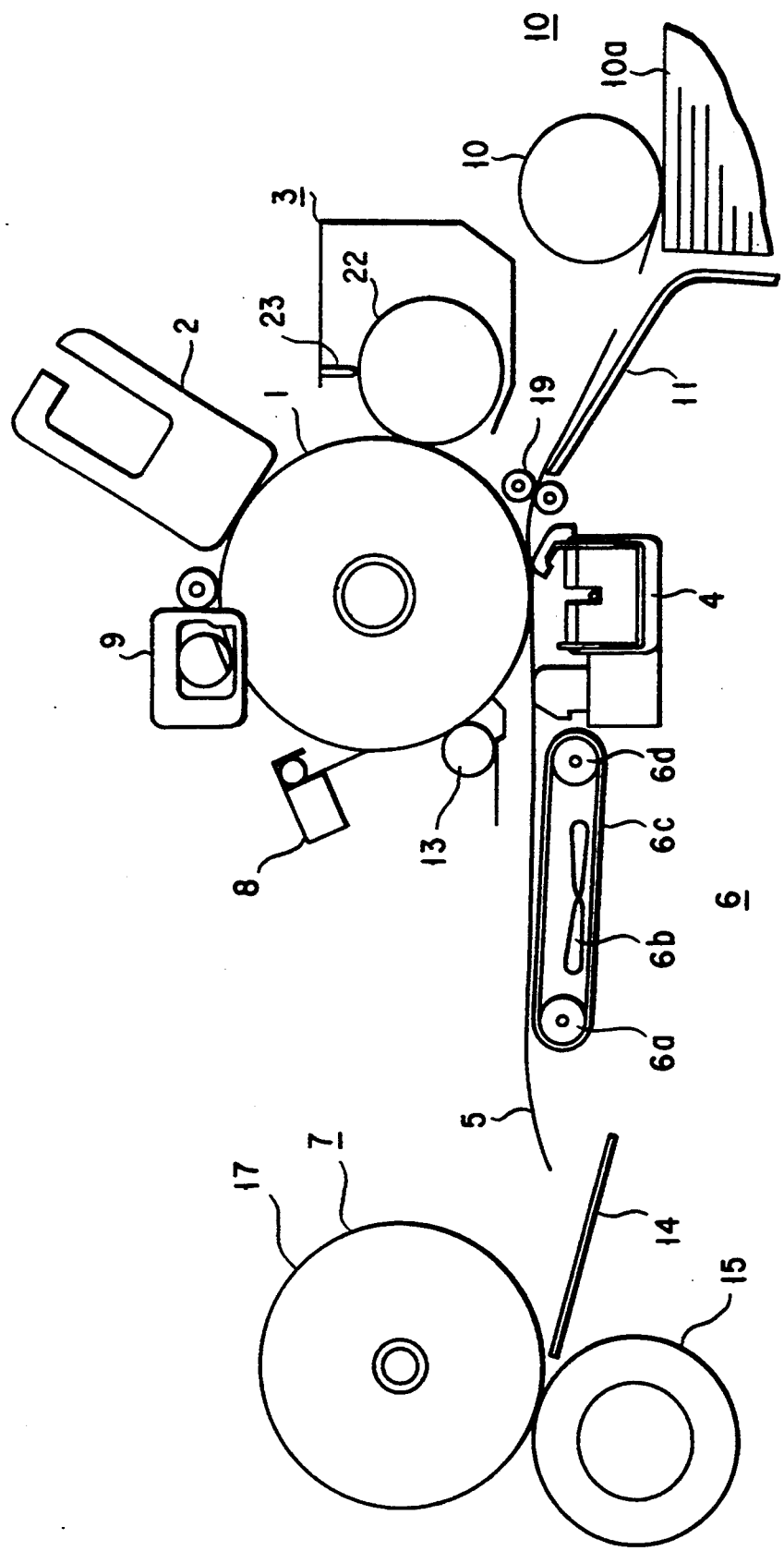
FIG. 23 is a diagram showing a schematic arrangement of a conventional electrostatic electrophotography apparatus.

An electrostatic electrophotography apparatus A is an ionography type printer used in Example 1, and an electrostatic electrophotography apparatus B is a laser beam printer using an OPC photosensitive body, which is shown in FIG. 6.

The electrostatic electrophotography apparatus B has an arrangement as shown in FIG. 6. Reference numeral 51 denotes an image carrier made of an OPC photosensitive drum; and 52, a latent image forming unit. The latent image forming unit 52 comprises a semiconductor laser light source 52a and a laser beam scan unit 52b having a polygon mirror, a reflecting mirror, and the like. A laser beam from the semiconductor laser light source 52a is caused by the laser beam scan unit 52b to scan the image carrier 51, thereby forming a latent image on the image carrier 51.

Reference numeral 59 denotes a charging unit for charging the image carrier 51; 53, a magnetic brush type developing unit; 54, a corona transfer unit; 56, a blade cleaning unit; 57, an optical charge removal unit; 55, a heat roll type fixing unit; and 58, a paper feed unit.

The image carrier 51 is uniformly charged by the charging unit 59 at the position of the charging unit 59. Thereafter, a negatively charged latent image is formed on the image carrier 51 by the latent image forming section 52 comprising a semiconductor laser light-emitting element, the laser beam scan unit 52b, and the like. The latent image is developed to form a toner image by the magnetic brush type developing unit 53, transferred to a sheet by the corona transfer unit 54, fixed by the fixing unit 55, and output as a printout.

The toner remaining on the image carrier 51 after transfer is removed by the blade cleaning unit 56, and the charges remaining on the image carrier 51 are removed by the optical charge removal unit 57.

The potentials of the latent images of the electrostatic electrophotography apparatuses A and B were measured by a surface potentiometer (manufactured by Monroe Co.). FIG. 12 shows the results.

A printing operation was performed by using the electrostatic electrophotography apparatuses A and B and employing the above three types of developing agents. Images as shown in FIG. 13 were obtained.

When the electrostatic electrophotography apparatus B that forms a latent image having a potential of $-1,000$ V is used, since the allowance of the developing agent was wide, a high-quality image was obtained with any developing agent. The image density was 1.4 or more, and no fog was observed. On the other hand, when the electrostatic electrophotography apparatus A that forms a latent image having a low potential of $-250$ V is used, the allowance of the developing conditions was narrow, and a high-quality image was obtained only with the developing agent of this example. In the electrostatic electrophotography apparatus A that forms a latent image having a low potential, when only the first magnetic toner was used, fog was observed, and when only the second magnetic toner was used, the image density was as low as 1.0 or less. Hence, neither the first nor second magnetic toner were suitable for practical applications if used singly.

From the above result, it was obvious that when the developing agents used in Example 6 are employed in ordinary electrostatic electrophotography apparatuses that form a latent image having a high potential, a high-quality image can be printed. It was also obvious that these developing agents are also suitable in electrostatic electrophotography apparatuses that form a latent image having a low potential. The developing agents used in Example 6 are suitable especially to, of the electrostatic electrophotography apparatuses that forms a latent image having a low potential, one that cannot print a high-quality image with an ordinary one-component toner, e.g., one that forms a latent image having a potential of 600 V or less in absolute value, and especially 300 V or less in absolute value.

EXAMPLE 7

In Example 7, the developing agents and the electrostatic electrophotography apparatus employed in Example 1 were used. As a developing bias power supply PWS of the electrostatic electrophotography apparatus, one that can generate a bias of 0 to 500 V in the AC voltage and a bias of 0 to −100 V in the DC voltage was used. These biases were applicable to the developing unit 3.

More specifically, the developing unit 3 has the sleeve 22 for supplying a toner to the image carrier (dielectric drum) 1 while agitating the toner. Since a bias is applied to the sleeve 22, in Example 1, a bias of −20 V was applied by the developing bias power supply PWS to the sleeve 22.

In Example 7, the value of the bias was variable in the range of 0 to 500 V in the AC voltage and in the range of 0 to −100 V in the DC voltage, and the DC voltage was superposed on the AC voltage. Experiments on the image density and fog were conducted by changing the value of the bias in these ranges. FIG. 14 shows the results.

From this result, it is obvious that with an AC voltage of 400 V or less, the bias width of the image free from fog can be set wide, and that with an AC voltage of 300 V or less, the bias width can be set especially wide.

A DC voltage of 0 to −60 V was especially suitable for superposition on the AC voltage. By using the developing agents and the electrostatic electrophotography apparatus employed in Example 1, continuous running was performed in the same manner as in Example 1 while applying an AC bias of 200 V and a DC bias of −20 V. As a result, when the printing operation of 600,000 sheets was completed, a high-quality image having a image density of 1.4, and free from fog was obtained.

Therefore, in order to obtain an image free from fog, it is effective to superpose a DC voltage of 0 to 60 V in absolute value to an alternating electric field of AC 100 V to 300 V and to apply the resultant bias. It is also effective to apply, as the bias, only a DC voltage of 0 to 60 V in absolute value.

EXAMPLE 8

In this example, the same magnetic toners as those of Example 1 are prepared. More specifically, as the first magnetic toner, a magnetic one-component toner consisting of about 65 wt. % of a resin and about 35 wt. % of a magnetic material, and having an average particle diameter of 13 $\mu$m is used. As the second magnetic toner, a magnetic one-component toner consisting of about 45 wt. % of a resin and about 55 wt. % of a magnetic material, and having an average particle diameter of 12 $\mu$m is used.

These prepared first and second magnetic toners were observed with an electronic microscope. The first magnetic toner had a smooth surface with substantially no magnetic particle exposed, while the second magnetic toner had a surface including many cracks caused by pulverization and exposed magnetic particles.

Both the first and second magnetic toners had a nature of being charged in the positive polarity. The charge amount was +7 $\mu$C/g in the first magnetic toner and +11 $\mu$C/g in the second magnetic toner.

The charge amount was measured by using a Blow-Off Powder Charge Amount Measuring Unit (Model No. TB-500 available from Toshiba Chemical Co.). Regarding the measuring method, a mixture was prepared by mixing and agitating a ferrite carrier (KBN-100 available from Hitachi Metal Co.) and each toner such that 5 wt. % of the toner was contained in the mixture. 0.2 g of this mixture were put in a Faraday cage mounted with a stainless steel mesh member having 400 mesh. Blow-off was performed with a nitrogen gas having an adjusted pressure of 1 kg/cm$^2$. Then, the charge amount was measured.

Of the prepared first and second magnetic toners described above, 80 parts by weight of the first magnetic toner and 20 parts by weight of the second magnetic toner were weighed. The two types of weighed magnetic toners were agitated in a ball mill for 1 hour, thereby preparing a starting developing agent (developing agent to be filled in the developing unit 3.

Separately from this starting developing agent, 99 parts by weight of the first magnetic toner and 1 part by weight of the second magnetic toner were weighed and mixed by agitation in the ball mill for 1 hour, thereby preparing a replenishing developing agent.

These developing agents were employed in an electrostatic electrophotography apparatus as shown in FIG. 1. The respective preset conditions and operation of the electrostatic electrophotography apparatus were as follows.

Regarding an image carrier 1, using an aluminum drum having a diameter of 43 mm, a resin was coated on the surface of this aluminum drum to a thickness of 40 $\mu$m and dried. A latent image forming unit 2 was of the ionography type, as described above.

As described above, the latent image forming unit 2, i.e., the ion head, has electrodes 31 and 32 formed in a matrix manner through an insulating member 30. An AC voltage of 2,500 V$_{p-p}$ at 1 MHz is applied across the electrodes 31 and 32 by an AC power supply 35 in the power supply, as shown in FIG. 3, thereby generating ions between the electrodes 31 and 32. Screen electrodes 34 have ion emission openings (holes 34a) formed to have a resolution of 300 dpi. When an extracting electric field is applied across the screen electrodes 34 and the electrodes 32, the ions are emitted from the holes 34a to the outside. Then, an electrostatic latent dot image 37 is formed on the image carrier 1 (dielectric drum) as shown in, e.g., FIG. 4. The latent image of this example has negative polarity.

The latent image formed on the image carrier 1 in this manner is developed by a developing unit 3 arranged close to the image carrier 1, thereby forming a toner image.

The developing unit 3 used in this apparatus has a toner convey mechanism in which both a sleeve 22 and a magnet roller 21 rotate, as shown in FIG. 25. The magnet roller 21 has eight poles with a magnetism of 600 Gs, and the sleeve 22 is made of a stainless steel cylinder having a diameter of 20 mm.

In this case, the sleeve 22 was rotated at 250 mm/sec. in the same direction as the image carrier 1 (dielectric drum), and the magnet roller 21 was rotated at 2,500 rpm. in the opposite direction to the sleeve 22. The magnetic toner was attracted by the magnetism of the magnet roller 21 to attach to the circumferential surface of the sleeve 22, while the sleeve 22 was rotated in the opposite direction to the magnet roller 21. As a result, the particles of the magnetic toner on the circumferential surface of the sleeve 22 were rotated on the sleeve 22, and were thus triboelectrified by friction between them.

The gap between the image carrier (dielectric drum) 1 and the sleeve 22 was set to 0.2 mm, and the gap between the sleeve 22 and a blade 23 was set to 0.15 mm to form a thin toner layer. A DC voltage of $-30$ V was applied as a bias by a developing bias power supply PWS to the sleeve 22.

By the developing unit 3 set to have these conditions, the charged toner on the sleeve 22 transits to the latent image on the image carrier (dielectric drum) 1, thereby developing the latent image. The toner image obtained by this development is transferred to a sheet by a transfer unit 4.

In this example, the transfer unit 4 is a transfer scorotron unit to which a negative high voltage is applied. A fixing unit 7 is a heat roll fixing unit. The temperature of the fixing unit 7 is adjusted to 190° C. in this example.

A cleaning unit 8 is a stainless steel blade cleaning unit and removes the toner remaining on the image carrier 1 after transfer.

An eraser 9 serving as the charge removal unit restores the potential on the image carrier 1 to a neutral potential (50 V or less). An AC corona charge removal unit is used as the eraser 9. Each recording sheet 5 is supplied from a paper feed unit 10, passes the toner image transfer section and the fixing section comprising the heat roll, and is output as a printout.

The starting developing agent prepared in the above manner was supplied to the developing unit 3 of this electrostatic electrophotography apparatus. The sleeve 22 was biased with the above bias conditions to agitate and thus charge the developing agent. The developing agent was used for development, and an image was output. An image having a high resolution was obtained. The image density obtained at this time was 1.4, and no fog was observed. The line width was 150 μm.

Subsequently, when entirely solid black images were continuously output, the image density of the images on the printed sheets 5 was not changed. Hence, solid black images having a uniform density and a high image quality were continuously obtained. Even when a white image was output immediately after solid black images were output, an abnormality, e.g., fog or an after-image did not occur on the output sheet 5, and a high-quality image or white image was obtained.

The replenishing developing agent prepared as described above was replenished in the image forming apparatus using this starting developing agent, and 400,000 sheets were printed. During the printing operation of 400,000 sheets, the drum and the developing unit were not exchanged, and accordingly the developing agent was not exchanged.

A change in image density during this continuous printing is almost the same as that shown in FIG. 5.

As is seen from FIG. 5, in this example, the black density was about 1.4 and was not reduced below 1.3. The white density was 0.06 with no change at all.

When the printing operation of 400,000 sheets was completed, the image density was 1.4, and no fog was observed. The line width was 150 μm. A solid black image with a high reproducibility was also obtained.

From the above result, it is obvious that the developing agent of Example 8 does not cause a change in image density even if only a DC bias is applied to the sleeve 22 for agitation, and thus has a high durability.

When the toner transited onto the dielectric drum (image carrier) 1 was recovered and measured by the Blow-Off Charge Amount Measuring Unit, a reading of $+20$ μC/g was obtained, indicating that the toner was positively charged and the charge amount was high.

The above image forming apparatus was partly modified. When a positive latent image, which was of the opposite polarity to that of an ordinary latent image, was formed, and the toner transited onto the dielectric drum in the same manner as described above was measured by the Blow-Off Charge Amount Measuring Unit, $-2$ μC/g was obtained, indicating that the toner was negatively charged.

The respective toners were collected, and their contents of the magnetic material were examined. The positively charged toner contained about 35 wt. % of a magnetic material, and the negatively charged toner contained about 55 wt. % of a magnetic material.

From this result, the following estimation can be made, although a full explanation of it is yet to come. The first magnetic toner having a small magnetic material content is positively charged, as an ordinary magnetic toner is, and the charge amount is increased, so that the charge amount of the opposite polarity is decreased, and a stable charge state is obtained. It is also estimated that the second magnetic toner having a large magnetic material content is negatively charged, which is the opposite polarity to that of the ordinary toner, and is not developed, thereby contributing to improvement of the charging performance of the first magnetic toner. It is assumed that a high image quality stabilizing performance for maintaining a stable image over a long period of time can thus be obtained.

As a comparative example, a one-component toner containing only the first magnetic toner prepared in this example was supplied to the electrostatic electrophotography apparatus of this embodiment, and a printing operation was performed. As a result, although the image density of the obtained printout was 1.4, fog was observed. When solid black images were printed, an image non-uniformity occurred starting from the second half of the first sheet. A one-component toner containing only the second magnetic toner prepared in this example was supplied to the electrostatic electrophotography apparatus, and a printing operation was performed. An image density of as low as 0.9 was obtained. With this apparatus, a sufficiently high image quality a printer should have was not obtained.

EXAMPLE 9

In Example 9, as the first magnetic toners, "toner #01" to "toner #05" as follows were prepared.

"Toner #01" is a magnetic one-component toner containing about 20 wt. % of a magnetic material, and having a charge amount of +5 µC/g and an average particle diameter of 12 µm. "Toner #02" is a magnetic one-component toner containing about 33 wt. % of a magnetic material, and having a charge amount of +3 µC/g and an average particle diameter of 13 µm. "Toner #03" is a magnetic one-component toner containing about 40 wt. % of a magnetic material, and having a charge amount of +2 µC/g and an average particle diameter of 12 µm. "Toner #04" is a magnetic one-component toner containing about 45 wt. % of a magnetic material, and having a charge amount of +10 µC/g and an average particle diameter of 12 µm. "Toner #05" is a magnetic one-component toner containing about 50 wt. % of a magnetic material, and having a charge amount of +12 µC/g and an average particle diameter of 12 µm.

When these first magnetic toners were observed with an electronic microscope, they all had a smooth surface with substantially no magnetic particle exposed.

As the second magnetic toner, a positively chargeable magnetic one-component toner containing about 55 wt. % of a magnetic material, and having a charge amount of +8 µC/g and an average particle diameter of 12 µm, which was the same magnetic toner as that of Example 1, was prepared. This magnetic toner has many magnetic particles exposed in the surface through cracks formed by pulverization.

80 parts by weight of each first toner and 20 parts by weight of the second toner were weighed and mixed by agitation in a ball mill for 1 hour, thereby preparing five types of developing agents ("toner #06" to "toner #010"). A printing operation was performed by employing these developing agents as initial developing agents in an electrostatic electrophotography apparatus identical to that used in Example 8. As replenishing developing agent use was made of a toner consisting of 99 parts by weight of the first toner and one part by weight of the second toner stirred together in the same way as the initial developing agents.

The evaluation items are the image density, fog, and reproducibility of a solid black image in an initial image, and a change in image density over a long period of time. Examinations concerning these evaluation items were made. FIG. 15 shows the result. Note that a printed image obtained in the initial printing operation is called an initial image, and that a printed image obtained until 100,000 sheets are printed is called a durability image.

As is apparent from FIG. 15, in the comparative example, all the toners had a problem in the initial image, e.g., the image density or fog, or had a change in long-term image density. However, in Example 9, all the toners had an improvement both in the initial image and the durability image. Especially, when the toners having a magnetic material content of 45 wt. % or less was used, a high-quality image was obtained.

EXAMPLE 10

As the first magnetic toner, a positively chargeable magnetic one-component toner consisting of about 65 wt. % of a resin and about 35 wt. % of a magnetic material, and having a charge amount of +6 µC/g and an average particle diameter of 13 µm was prepared. When this first magnetic toner was observed with an electronic microscope, it had a smooth surface with substantially no magnetic particle exposed.

As the second magnetic toners, "toner #011" to "toner #016" as follows were prepared.

Of the second magnetic toners, "toner #011" is a magnetic one-component toner containing about 40 wt. % of a magnetic material, and having a charge amount of +13 µC/g and an average particle diameter of 11 µm, which is externally added with carbon. "Toner #012" is a magnetic one-component toner containing about 50 wt. % of a magnetic material, and having a charge amount of +15 µC/g and an average particle diameter of 12 µm, which has no carbon externally added and substantially no magnetic material exposed. "Toner #013" is a magnetic one-component toner containing about 55 wt. % of a magnetic material, and having a charge amount of +8 µC/g and an average particle diameter of 12 µm, which has a magnetic material exposed on the surfaces of the toner particles.

"Toner #014" is a magnetic one-component toner containing about 55 wt. % of a magnetic material, and having a charge amount of +7 µC/g and an average particle diameter of 10 µm, which has no carbon externally added and substantially no magnetic material exposed. "Toner #015" is a magnetic one-component toner containing about 65 wt. % of a magnetic material, and having a charge amount of +4 µC/g and an average particle diameter of 15 µm, which has carbon externally added.

80 parts by weight of the first magnetic toner and 20 parts by weight of each second magnetic toner were weighed and mixed by agitation in a ball mill for 1 hour, thereby preparing six types of developing agents (toners #16 to #21).

A printing operation was performed by employing these developing agents in an electrostatic electrophotography apparatus identical to that used in Example 8. As a comparative example, a printing operation was performed by employing a developing agent (to be referred to as "toner #022") containing only the first magnetic toner described above in the electrostatic electrophotography apparatus identical to that used in Example 8.

Examinations concerning evaluation items including the image density, fog, and reproducibility of a solid black image in an initial image, and a change in image density as a long-term image quality stabilization performance were made. FIG. 16 shows the result. Note that a printed image obtained in the initial printing operation is called an initial image, and that a printed image obtained until 100,000 sheets are printed is called a durability image, in the same manner as in above examples.

As is apparent from FIG. 16, of this example, in cases wherein toners containing 45 wt. % or more of a magnetic material were used as the second magnetic toners, when a toner having carbon or the magnetic material exposed to its surface is used, an image indicating very good results in all the check items was obtained.

However, when a toner having no carbon or magnetic particle exposed to the surface is used, or in the comparative example, the initial image had a problem, e.g., fog, reproducibility of the solid black image, and the like, or showed a change in image density as a long-term stability.

EXAMPLE 11

In this example, as the first magnetic toner, a magnetic one-component toner containing about 35 wt. % of a magnetic material and having an average particle diameter of 13 µm, which was the same as that used in Example 8, was prepared. As the second magnetic toner, a magnetic one-component toner containing about 55 wt. % of a magnetic material and having an average particle diameter of 12 μm was prepared.

The first and second magnetic toners were observed with an electronic microscope. As in Example 1, the first magnetic toner had a smooth surface with substantially no magnetic particle exposed, while the second magnetic toner had a surface including many cracks caused by pulverization and many exposed magnetic particles.

Similarly, both the first and second magnetic toners were chargeable in the positive polarity. The blow-off charge amount was +7 μC/g in the first magnetic toner and +11 μC/g in the second magnetic toner.

10, 20, 50, 80, 90, 95, and 99 parts by weight of the first magnetic toner were separately weighed, and 90, 80, 50, 20, 10, 5, and 1 parts by weight of the second magnetic toner were separately weighed. The weighed respective first and second magnetic toners were mixed by agitation in a ball mill for 1 hour, thereby preparing developing agents. The prepared seven types of developing agents will be referred to as "toner #023", "toner #024", "toner #025", "toner #026", "toner #027", "toner #028", and "toner #029", respectively.

A printing operation was performed by separately employing these developing agents in an electrostatic electrophotography apparatus identical to that used in Example 8. As comparative examples, a printing operation was performed by employing a developing agent (to be referred to as "toner #030") containing only the first magnetic toner described above, and a developing agent (to be referred to as "toner #031") containing only the second magnetic toner in an electrostatic electrophotography apparatus identical to that used in Example 1.

Examinations concerning evaluation items including the image density, fog, and reproducibility of a solid black image in an initial image, and a change in image density, obtained after continuous running of the printing operation, as a long-term image quality stabilization performance were made. FIG. 17 shows the result.

As is apparent from FIG. 17, in the comparative examples, the toners had a problem in the initial image, e.g., fog or reproducibility of the solid black image, or had a change in image density as the long-term stability performance.

On the other hand, in the case of this example, all the toners had an improvement both in the initial image and the durability image. In addition, with the developing agents "toner #024" to "toner #028" containing 20 to 95 parts by weight of the first magnetic toner and 5 to 80 parts by weight of the second toner, images having high evaluations in all the items were obtained.

EXAMPLE 12

In this example, as the first magnetic toner, a magnetic one-component toner containing about 35 wt. % of a magnetic material and having an average particle diameter of 13 μm, which is the same as that used in Example 8, was prepared. As the second magnetic toner, a magnetic one-component toner containing about 55 wt. % of a magnetic material and having an average particle diameter of 12 μm was prepared.

The first and second magnetic toners were observed with an electronic microscope. As in Example 8, the first magnetic toner had a smooth surface with substantially no magnetic particle exposed, while the second magnetic toner had a surface including many cracks caused by pulverization and exposed magnetic particles.

Similarly, both the first and second magnetic toners were chargeable in the positive polarity. The blow-off charge amount was +7 μC/g in the first magnetic toner and +11 μC/g in the second magnetic toner.

80 parts by weight of the first magnetic toner and 20 parts by weight of the second magnetic toner were weighed and agitated in a ball mill for 1 hour, thereby preparing a starting developing agent to be filled in the developing unit first.

Separately from the above starting developing agent, nine different amounts were weighed from each of the first and second magnetic toners, as shown in FIG. 18, and mixed by agitation in a ball mill for about 1 hour, thereby preparing replenishing developing agents. The obtained replenishing developing agents will be referred to as "toner #032", "toner #033", "toner #034", "toner #035", "toner #036", "toner #037", "toner #038", "toner #039", and "toner #040".

A printing operation was performed by employing the prepared starting developing agent in an electrostatic electrophotography apparatus identical to that used in Example 8. Furthermore, a continuous printing operation was performed by this electrostatic electrophotography apparatus while separately replenishing the above replenishing developing agents. Since there were nine types of replenishing toners, a continuous printing operation was performed for each replenishing toner. FIG. 19 shows a change in image density during continuous printing which is obtained in the same manner as in Example 8.

From the above result, it is obvious that if the content of the first toner (having a low magnetic material content) in the replenishing developing agent is set to 70 parts by weight or more, the image density is comparatively constant in continuous running, and that if the content of the first toner is set to 90 parts by weight or more, substantially no change occurs in the image density, so that a stable image can be obtained.

EXAMPLE 13

A printing operation was performed by the following two types of electrostatic electrophotography apparatuses A and B by employing the developing agent used in Example 8 and the first and second magnetic toners used in Example 8.

An electrostatic electrophotography apparatus A is an ionography type printer used in Example 1, and an electrostatic electrophotography apparatus B is a laser beam printer using an OPC photosensitive body, which is shown in FIG. 6.

The electrostatic electrophotography apparatus B has an arrangement as shown in FIG. 6. Reference numeral 51 denotes an image carrier made of an OPC photosensitive drum; and 52, a latent image forming unit. The latent image forming unit 52 comprises a semiconductor laser light source 52a and a laser beam scan unit 52b having a polygon mirror, a reflecting mirror, and the like. A laser beam from the semiconductor laser light source 52a is caused by the laser beam scan unit 52b to scan the image carrier 51, thereby forming a latent image on the image carrier 51. Reference numeral 59 denotes a charging unit for charging the image carrier 51; 53, a magnetic brush type developing unit; 54, a corona transfer unit; 56, a blade cleaning unit; 57, an optical charge removal unit; 55, a heat roll type fixing unit; and 58, a paper feed unit.

The image carrier 51 rotated in one direction is uniformly charged by the charging unit 59 at the position of the charging unit 59. Thereafter, a negatively charged latent image is formed on the image carrier 51 by the latent image forming section 52 comprising a semiconductor laser light-emitting element, the laser beam scan unit 52b, and the like. The latent image is developed by the magnetic brush type developing unit 53 to form a toner image, transferred to a sheet by the corona transfer unit 54, fixed by the fixing unit 55, and output as a printout. The toner remaining on the image carrier 51 after transfer is removed by the blade cleaning unit 56, and the charges remaining on the image carrier 51 are removed by the optical charge removal unit 57.

The potentials of the latent images of the electrostatic electrophotography apparatuses A and B were measured by a surface potentiometer (manufactured by Monroe Co.). FIG. 20 shows the results.

A printing operation was performed by using the electrostatic electrophotography apparatuses A and B and employing the above three types of developing agents. Images as shown in FIG. 21 were obtained.

when the electrostatic electrophotography apparatus B that forms a latent image having a potential of −800 V was used, since the allowance for the developing agent was wide, a high-quality image was obtained with any developing agent. The image density was 1.4 or more, and no fog was observed. On the other hand, when the electrostatic electrophotography apparatus A that forms a latent image having a low potential of −300 V was used, the allowance for the developing conditions was narrow, and a high-quality image was obtained only with the developing agent of this example. When only the first magnetic toner was used, fog was observed, and when only the second magnetic toner was used, the image density was as low as 1.0 or less. Hence, neither the first nor second magnetic toner were suitable for practical applications if used singly.

From the above result, it was obvious that when the developing agents of this example are employed in ordinary electrostatic electrophotography apparatuses that form a latent image having a high potential, a high-quality image can be printed. It was also obvious that these developing agents are also suitable in electrostatic electrophotography apparatuses that form a latent image having a low potential, e.g., 600 V or less in absolute value, which cannot be printed with a high quality if only an ordinary one-component toner is used.

EXAMPLE 14

The developing agents and the electrostatic electrophotography apparatus employed in Example 8 were used. As a developing bias power supply PWS, one that can generate a bias of 0 to 500 V in the AC voltage and a bias of 0 to −100 V in the DC voltage was used. Biases in these ranges were applicable to a developing unit 3.

More specifically, the developing unit 3 has a sleeve 22 for supplying a toner to an image carrier (dielectric drum) 1 while agitating the toner. Since a developing bias is applied to the sleeve 22, in Example 8, a bias of −30 V was applied by the developing bias power supply PWS to the sleeve 22.

In Example 14, the value of the bias applied to the sleeve 22 was variable in the range of 0 to 500 V in the AC voltage and in the range of 0 to −100 V in the DC voltage, and the DC voltage was superposed on the AC voltage. Experiments on the image density and fog were conducted by changing the value of the bias in these ranges. FIG. 22 shows the results.

From this result, it is obvious that if the AC voltage bias applied to the sleeve 22 is set to 400 V or less, the range of the DC bias capable of obtaining an image free from fog can be set wide. Furthermore, if the AC voltage bias is set to 300 V or less, a more preferable result can be obtained. If the DC voltage superposed on the AC voltage is set in the range of 0 to −60 V, the obtained image has little fog. Above all, it is more suitable if the DC voltage is set in the range of −20 to −60 V. The image density was 1.4 for any bias value, with no difference observed.

By using the electrostatic electrophotography apparatus employed in Example 8 and the developing agents of the present invention used in Examples 8 to 12, continuous running was performed in the same manner as in Example 8 while applying an AC bias of 200 V and a DC bias of −30 V as a bias to be applied to the sleeve 22. As a result, when the printing operation of 600,000 sheets was completed, a high-quality image having a image density of 1.4, and free from fog was obtained.

Therefore, in order to obtain an image free from fog, it is effective to superpose a DC voltage of 0 to 60 V in absolute value to an alternating electric field of AC 100 V to 300 V, or to superpose a DC voltage of 20 to 40 V in absolute value to an alternating electric field of AC 100 to 500 V, and to apply the resultant bias. It is also effective to apply, as the bias, only a DC voltage of −20 to 40 V in absolute value.

The present invention is not limited to the examples described above, and various changes and modifications may be made without departing from the spirit and scope of the invention.

Various examples of the present invention have been described so far. In fine, the present invention uses a developing agent obtained by mixing the first magnetic toner having a magnetic material content of 45 wt. % or less, a comparatively low magnetism, and a low charge amount, and the second magnetic toner having a magnetic material content of 45 wt. % or more, a comparatively high magnetism, and a low charge with conductive particles present on its surface, with a formulating proportion of 10:90 to 99:1. Hence, the second magnetic toner having a comparatively high magnetism is used in place of a carrier, and the first magnetic toner is used for development.

As a result, the following effects are obtained.

According to the first effect, since the second magnetic toner used as the carrier has a comparatively high magnetism, it is largely moved on the sleeve by the magnet roller, promoting the agitating operation. Then, even a small amount of a toner attaching to the sleeve to interfere with charging can be removed. Also, heavy attachment of the toner to the sleeve, that occurs when a high-potential latent image, e.g., a solid black image, is developed, leading to image non-uniformity, can be prevented by this agitating operation.

According to the second effect, charging stability between the toners can be obtained.

This second effect is obtained due to the following two reasons.

Firstly, when the first magnetic toner having a comparatively low magnetism is mixed with the second magnetic toner having a comparatively high magnetism, the effect of agitation by the magnet roller is increased, thereby promoting charging between the toners.

Secondly, since the second magnetic toner has conductive particles exposed to its toner surface, charges in the opposite polarity are removed through the conductive particles, so that stable toner charging can be obtained. Hence, unstable charging between toners having a low magnetism or charging in the opposite polarity can be prevented.

As a result, the toner having a low magnetism is stably charged in the same polarity, so that an image having a high image density and free from fog can be obtained.

In toner particles having conductive particles present on its surface, a magnetic material, e.g., magnetite, is exposed to the toner particles. Even if the magnetic material is not intentionally exposed to the toner particles, if the toner contains a rather large amount of the magnetic material, e.g., 45 wt. % or more, the magnetic material is often exposed to the surface of the toner. Accordingly, the second magnetic toner comprising toner particles having conductive particles present on its surface, which is used in the present invention, can be manufactured easily and marketed at a low price.

In another case for obtaining conductivity, carbon is added to the surface of the second magnetic toner. In this case, since the second magnetic toner contains a large amount of a magnetic material, it is attracted by the magnetic roller comparatively easily, so that it cannot originally be used easily for development. In addition, such a second magnetic toner is not charged, or is charged with a very small charge amount. In this case, the second magnetic toner is charged in the opposite polarity to that of the first magnetic toner, and thus it has the same polarity as that of the potential of the latent image, minimizing the toner consumption of the second magnetic toner for development. Therefore, if a necessary amount of the second magnetic toner is supplied before starting the operation, only the first low-magnetism toner or a very small amount of the second magnetic toner need be replenished later on.

Usually, a mixture containing 30 to 99 wt. % of the first toner and 1 to 70 wt. % of the second toner is supplied to the developing unit first as the starting developing agent. As a replenishing developing agent used for replenishment later on, one obtained by mixing to contain 90 to 100 wt. % of the first toner and 0 to 10 wt. % of the second toner may be used.

As has been described above, according to the present invention, charging of the magnetic toner is stabilized so that the state of a high-quality image free from a degradation in image or a non uniformity can be maintained over a long period of time.

The present invention is not limited to the examples described above, and various changes and modifications may naturally be made without departing from the spirit and scope of the invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A developing agent comprising a first magnetic toner containing less than 45 wt. % of magnetic powder dispersed in a resin, and a second magnetic toner containing not less than 45 wt. % of magnetic powder dispersed in a resin, wherein said first and second magnetic toners are charged with a blow-off charge amount of not more than 12 $\mu$C/g in absolute values in the same polarity, and said first and second magnetic toners are mixed to be contained in a proportion of 20 to 99 parts by weight and 1 to 80 parts by weight, respectively and wherein a difference in the weight percent of magnetic powder constituting a portion of the first and second magnetic toners is such as to result in improving the toner agitation effect.

2. A developing agent comprising a first magnetic toner having a low magnetism and containing less than 45 wt. % of magnetic powder dispersed in a resin, and a second magnetic toner having a high magnetism and containing not less than 45 wt. % of magnetic powder dispersed in a resin, conductive particles being present on a surface of the second magnetic toner, wherein a difference in the weight percent of magnetic powder constituting a portion of the first and second magnetic toners is such as to result in improving the toner agitation effect, and wherein said first and second magnetic toners are mixed to be contained with a formulating proportion of 10 to 99 parts by weight and 1 to 90 parts by weight, respectively.

3. A developing agent according to claim 2, wherein the conductive particles are made of magnetite.

4. A developing agent according to claim 2, wherein the conductive particles are made of carbon.

5. In an electrostatic electrophotography apparatus comprising an image carrier capable of forming an electrostatic latent image thereon, a charged toner serving as a developing agent, and developing means for developing the electrostatic latent image formed on said image carrier with said developing agent, to thereby obtain an image, the improvement wherein:

said developing agent comprises a mixture of:

a first magnetic toner containing less than 45 wt. % of a magnetic powder dispersed in a resin and which is a low-charge toner having a blow-off charge amount of not more than 12 $\mu$C/g in absolute value, and a second magnetic toner containing more than 45 wt. % of a magnetic powder dispersed in a resin and which is a low-charge toner having a blow-off charge amount whose absolute value is substantially equivalent to that of the blow-off charge amount of the first magnetic powder, whereby an amount of said magnetic powder contained in said second magnetic toner is larger than an amount of said magnetic powder contained in said first magnetic toner; and said magnetic powders of said first magnetic toner and said second magnetic toner each comprise particles, the particles of said magnetic powder of said first magnetic toner having an average diameter which is substantially equal to an average diameter of the particles of said magnetic powder of said second magnetic toner.

6. An apparatus according to claim 5, wherein said first and second magnetic toners are charged in a same polarity when said first and second magnetic toners are stirred separate from each other.

7. An apparatus according to claim 5, wherein said developing agent is obtained by mixing to contain 20 to 99 parts by weight of said first magnetic toner and 1 to 80 parts by weight of said second magnetic toner.

8. An apparatus according to claim 5, wherein said first and second magnetic toners of said developing agent are charged in different polarities when being mixed, and said first magnetic toner having a low magnetism uses a toner which is charged in the same polarity as that obtained in accordance with blow-off charging.

9. An apparatus according to claim 5, wherein the electrostatic latent image formed on said image carrier has a potential of not more than 600 V in absolute value.

10. An apparatus according to claim 5, wherein the electrostatic latent image formed on said image carrier has a potential of not more than 300 V in absolute value.

11. An electrostatic electrophotography apparatus which, by using an image carrier capable of forming an electrostatic latent image thereon and a charged toner serving as a developing agent, develops the electrostatic latent image formed on said image carrier with said developing agent, thereby obtaining an image, wherein
said apparatus comprises a developing agent convey mechanism for conveying said developing agent, said developing agent convey mechanism comprising a cylindrical sleeve arranged close to said image carrier and rotated, and a magnet roller arranged in said sleeve, and
said developing agent is a mixture of a first magnetic toner which is a low-charge toner having a blow-off charge amount of not more than 12 $\mu$C/g in absolute value and containing less than 45 wt. % of magnetic powder dispersed in a resin, and a second magnetic toner which is a low-charge toner having a blow-off charge amount whose absolute value is substantially equivalent to that of the blow-off charge amount of the first magnetic powder dispersed in a resin and containing more than 45 wt. % of magnetic powder, wherein a difference in the weight percent of magnetic powder constituting a portion of the first and second magnetic toners is such as to result in improving the toner agitation effect.

12. An apparatus according to claim 11, wherein said first and second magnetic toners are charged in a same polarity when said first and second magnetic toners are separate from each other.

13. An apparatus according to claim 11, wherein said developing agent is obtained by mixing to contain 20 to 99 parts by weight of said first magnetic toner and 1 to 80 parts by weight of said second magnetic toner.

14. An apparatus according to claim 11, wherein said first and second magnetic toners of said developing agent are charged in different polarities when mixed, and said first magnetic toner uses a toner which is charged in the same polarity as that obtained in accordance with blow-off charging.

15. An apparatus according to claim 11, wherein the electrostatic latent image formed on said image carrier has a potential of not more than 600 V in absolute value.

16. An apparatus according to claim 11, wherein the electrostatic latent image formed on said image carrier has a potential of not more than 300 V in absolute value.

17. An apparatus according to claim 11, wherein said magnet roller is not rotated.

18. An apparatus according to claim 11, wherein said magnet roller is rotated in the same direction as said sleeve.

19. An apparatus according to claim 11, wherein said magnet roller has a large number of magnetic poles formed on a circumferential surface thereof.

20. An apparatus according to claim 1, wherein the amount of magnetic powder contained in said second magnetic toner is larger than the amount of magnetic powder contained in said first magnetic toner by about 5 wt. %.

21. An apparatus according to claim 1, wherein said first and second magnetic toners assume different polarities when stirred together in a mixed state.

22. An apparatus according to claim 7, wherein the amount of magnetic powder contained in said second magnetic toner is larger than the amount of magnetic powder contained in said first magnetic toner by about 5 wt. %.

23. An apparatus according to claim 7, wherein said first and second magnetic toners assume different polarities when stirred together in a mixed state.

24. An apparatus according to claim 16, wherein the amount of magnetic powder contained in said second magnetic toner is larger than the amount of magnetic powder contained in said first magnetic toner by about 5 wt. %.

25. An apparatus according to claim 16, wherein said first and second magnetic toners assume different polarities when stirred together in a mixed state.

26. An apparatus according to claim 17, wherein the amount of magnetic powder contained in said second magnetic toner is larger than the amount of magnetic powder contained in said first magnetic toner by about 5 wt. %.

27. An apparatus according to claim 17, wherein said first and second magnetic toners assume different polarities when stirred together in a mixed state.

* * * * *